(12) United States Patent
Ochiai

(10) Patent No.: US 12,267,472 B2
(45) Date of Patent: Apr. 1, 2025

(54) IMAGE PROCESSING APPARATUS CAPABLE OF PREVENTING FAILURE IN DECODING ADDITIONAL INFORMATION EMBEDDED IN PRINT, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Tsubasa Ochiai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/488,195

(22) Filed: Oct. 17, 2023

(65) Prior Publication Data

US 2024/0146860 A1 May 2, 2024

(30) Foreign Application Priority Data

Oct. 28, 2022 (JP) .................................. 2022-173680

(51) Int. Cl.
*H04N 1/32* (2006.01)
*H04N 1/00* (2006.01)
*H04N 1/405* (2006.01)

(52) U.S. Cl.
CPC ..... *H04N 1/32229* (2013.01); *H04N 1/00867* (2013.01); *H04N 1/32144* (2013.01); *H04N 1/32149* (2013.01); *H04N 1/405* (2013.01)

(58) Field of Classification Search
CPC ...................................... H04N 1/32128–32352
See application file for complete search history.

(56) References Cited

U.S. PATENT DOCUMENTS 10,469,701 B2 * 11/2019 Iguchi ................ H04N 1/32315
11,245,810 B2 * 2/2022 Mizoguchi ......... H04N 1/32219

FOREIGN PATENT DOCUMENTS

JP         2000305429 A      11/2000

* cited by examiner

*Primary Examiner* — Barbara D Reinier
(74) *Attorney, Agent, or Firm* — ROSSI, KIMMS & McDOWELL LLP

(57) ABSTRACT

An image processing apparatus capable of preventing failure in decoding additional information embedded in a print. The apparatus performs image processing for generating a print in which additional information is embedded. A halftone pattern used for halftone processing is set out of a plurality of halftone patterns. It is determined whether or not, in a case where the set halftone pattern is used for the halftone processing, encoded patterns generated based on the additional information can be uniformly reproduced from a color plane with which the encoded patterns are synthesized. In a case where it is determined that the encoded patterns cannot be uniformly reproduced, a warning notification is performed for notifying before outputting a print in which the additional information is embedded, a user that the print is a print which can cause failure in decoding the additional information.

9 Claims, 21 Drawing Sheets

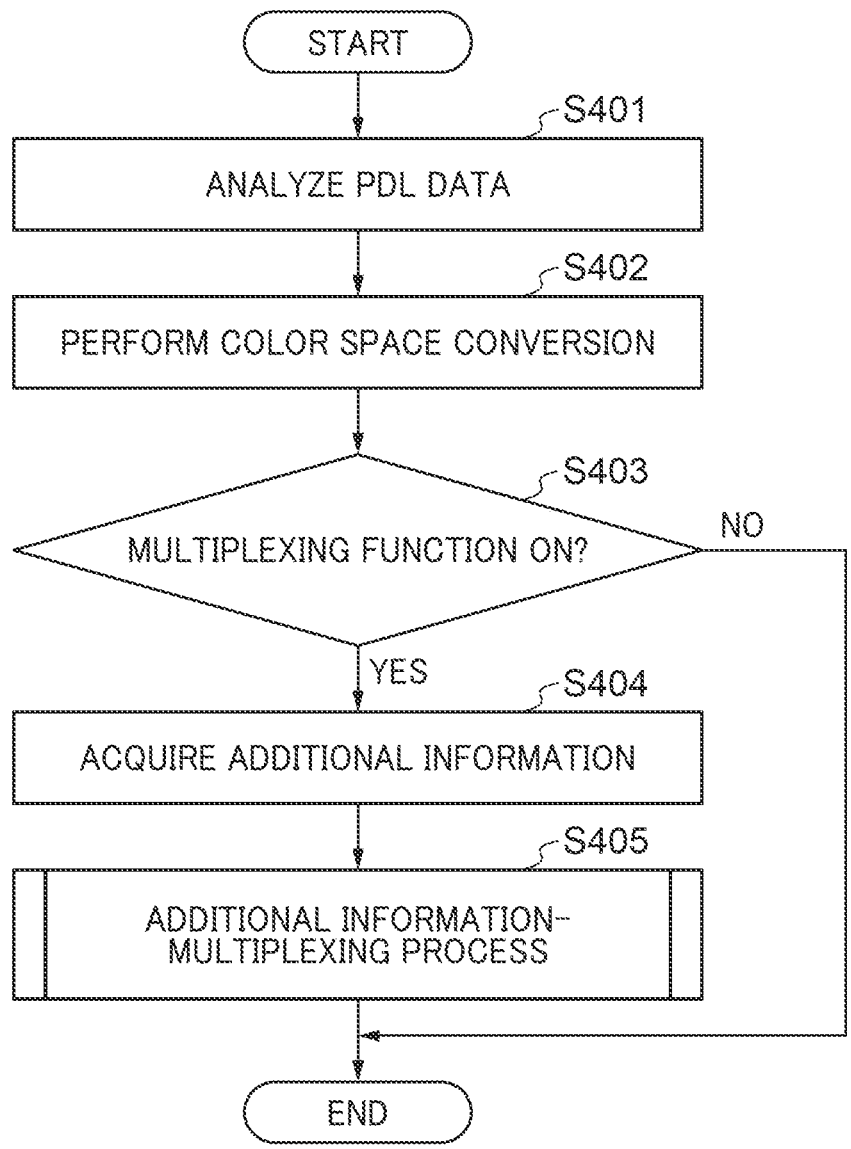

*FIG. 6A*

| 0 | 0 | 0 | 0 | 72 | 72 | 72 | 72 | 72 | 72 |
|---|---|---|---|----|----|----|----|----|----|
| 0 | 0 | 72 | 72 | 72 | 72 | 72 | 72 | 0 | 0 |
| 72 | 72 | 72 | 72 | 72 | 72 | 0 | 0 | 0 | 0 |
| 72 | 72 | 72 | 72 | 0 | 0 | 0 | 0 | 72 | 72 |
| 72 | 72 | 0 | 0 | 0 | 0 | 72 | 72 | 72 | 72 |
| 0 | 0 | 0 | 0 | 72 | 72 | 72 | 72 | 72 | 72 |
| 0 | 0 | 72 | 72 | 72 | 72 | 72 | 72 | 0 | 0 |
| 72 | 72 | 72 | 72 | 72 | 72 | 0 | 0 | 0 | 0 |
| 72 | 72 | 72 | 72 | 0 | 0 | 0 | 0 | 72 | 72 |
| 72 | 72 | 0 | 0 | 0 | 0 | 72 | 72 | 72 | 72 |

*FIG. 6B*

| 0 | 0 | 72 | 72 | 72 | 0 | 0 | 72 | 72 | 72 |
|---|---|----|----|----|---|---|----|----|----|
| 0 | 0 | 72 | 72 | 72 | 0 | 0 | 72 | 72 | 72 |
| 72 | 0 | 0 | 72 | 72 | 72 | 0 | 0 | 72 | 72 |
| 72 | 0 | 0 | 72 | 72 | 27 | 0 | 0 | 72 | 72 |
| 72 | 72 | 0 | 0 | 72 | 72 | 72 | 0 | 0 | 72 |
| 72 | 72 | 0 | 0 | 72 | 72 | 72 | 0 | 0 | 0 |
| 72 | 72 | 72 | 0 | 0 | 72 | 72 | 72 | 0 | 0 |
| 72 | 72 | 72 | 0 | 0 | 72 | 72 | 72 | 0 | 0 |
| 0 | 72 | 72 | 72 | 0 | 0 | 72 | 72 | 72 | 0 |
| 0 | 72 | 72 | 72 | 0 | 0 | 72 | 72 | 72 | 0 |

FIG. 9

| | CYAN | MAGENTA | YELLOW | BLACK |
|---|---|---|---|---|
| PATTERN 1 | 134 lpi, 27 deg, DOT | 166 lpi, 34 deg, DOT | 134 lpi, 117 deg, LINE | 141 lpi, 45 deg, DOT |
| PATTERN 2 | 190 lpi, 72 deg, DOT | 134 lpi, 117 deg, LINE | 240 lpi, 90 deg, DOT | 212 lpi, 45 deg, DOT |
| PATTERN 3 | 268 lpi, 63 deg, DOT | 268 lpi, 27 deg, DOT | 300 lpi, 0 deg, DOT | 282 lpi, 45 deg, DOT |

PATTERN 1: DEFAULT (LOW SCREEN RULING)
PATTERN 2: DEFAULT (HIGH SCREEN RULING)

FIG. 13A

| 0 | 0 | 0 | 0 | 2 | 2 | 2 | 2 | 2 | 2 |
|---|---|---|---|---|---|---|---|---|---|
| 0 | 0 | 2 | 2 | 2 | 2 | 2 | 2 | 0 | 0 |
| 2 | 2 | 2 | 2 | 2 | 2 | 0 | 0 | 0 | 0 |
| 2 | 2 | 2 | 2 | 0 | 0 | 0 | 0 | 2 | 2 |
| 2 | 2 | 0 | 0 | 0 | 0 | 2 | 2 | 2 | 2 |
| 0 | 0 | 0 | 0 | 2 | 2 | 2 | 2 | 2 | 2 |
| 0 | 0 | 2 | 2 | 2 | 2 | 2 | 2 | 0 | 0 |
| 2 | 2 | 2 | 2 | 2 | 2 | 0 | 0 | 0 | 0 |
| 2 | 2 | 2 | 2 | 0 | 0 | 0 | 0 | 2 | 2 |
| 2 | 2 | 0 | 0 | 0 | 0 | 2 | 2 | 2 | 2 |

FIG. 13B

| 0 | 0 | 2 | 2 | 2 | 0 | 0 | 2 | 2 | 2 |
|---|---|---|---|---|---|---|---|---|---|
| 0 | 0 | 2 | 2 | 2 | 0 | 0 | 2 | 2 | 2 |
| 2 | 0 | 0 | 2 | 2 | 2 | 0 | 0 | 2 | 2 |
| 2 | 0 | 0 | 2 | 2 | 27 | 0 | 0 | 2 | 2 |
| 2 | 2 | 0 | 0 | 2 | 2 | 2 | 0 | 0 | 2 |
| 2 | 2 | 0 | 0 | 2 | 2 | 2 | 0 | 0 | 0 |
| 2 | 2 | 2 | 0 | 0 | 2 | 2 | 2 | 0 | 0 |
| 2 | 2 | 2 | 0 | 0 | 2 | 2 | 2 | 0 | 0 |
| 0 | 2 | 2 | 2 | 0 | 0 | 2 | 2 | 2 | 0 |
| 0 | 2 | 2 | 2 | 0 | 0 | 2 | 2 | 2 | 0 |

FIG. 16A
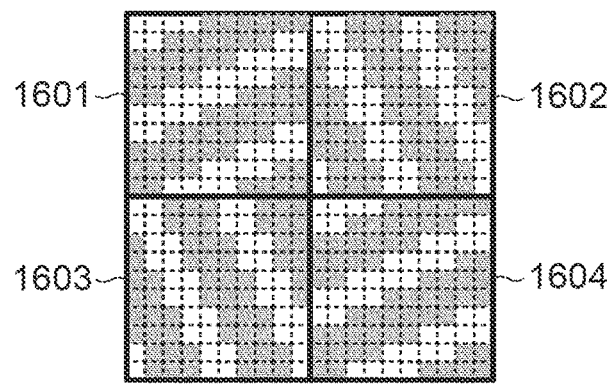
FIG. 16B
| 0 | 40 | 80 | 67 | 107 | 147 | 187 | 174 | 214 | 254 |
|---|---|---|---|---|---|---|---|---|---|
| 53 | 94 | 134 | 120 | 160 | 201 | 241 | 227 | 27 | 13 |
| 107 | 147 | 187 | 174 | 214 | 254 | 0 | 40 | 80 | 67 |
| 160 | 201 | 241 | 227 | 27 | 13 | 53 | 94 | 134 | 120 |
| 214 | 254 | 0 | 40 | 80 | 67 | 107 | 147 | 187 | 174 |
| 27 | 13 | 53 | 94 | 134 | 120 | 160 | 201 | 241 | 227 |
| 80 | 67 | 107 | 147 | 187 | 174 | 214 | 254 | 0 | 40 |
| 134 | 120 | 160 | 201 | 241 | 227 | 27 | 13 | 53 | 94 |
| 187 | 174 | 214 | 254 | 0 | 40 | 80 | 67 | 107 | 147 |
| 241 | 227 | 27 | 13 | 53 | 94 | 134 | 120 | 160 | 201 |
| 0 | 40 | 80 | 67 | 107 | 147 | 187 | 174 | 214 | 254 |
| 53 | 94 | 134 | 120 | 160 | 201 | 241 | 227 | 27 | 13 |
| 107 | 147 | 187 | 174 | 214 | 254 | 0 | 40 | 80 | 67 |
| 160 | 201 | 241 | 227 | 27 | 13 | 53 | 94 | 134 | 120 |
| 214 | 254 | 0 | 40 | 80 | 67 | 107 | 147 | 187 | 174 |
| 27 | 13 | 53 | 94 | 134 | 120 | 160 | 201 | 241 | 227 |
FIG. 16C
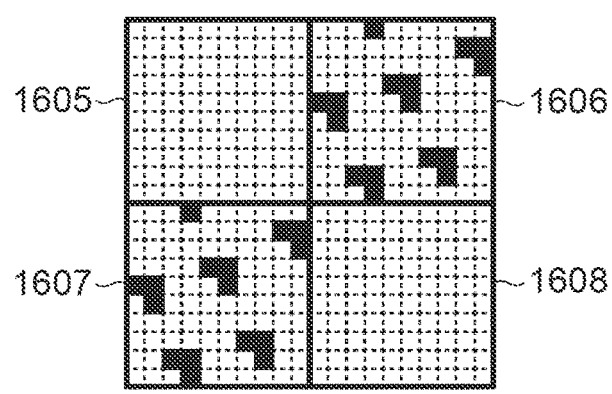

IMAGE PROCESSING APPARATUS CAPABLE OF PREVENTING FAILURE IN DECODING ADDITIONAL INFORMATION EMBEDDED IN PRINT, METHOD OF CONTROLLING IMAGE PROCESSING APPARATUS, AND STORAGE MEDIUM

BACKGROUND OF THE INVENTION

Field of the Invention

The present invention relates to an image processing apparatus that is capable of preventing failure in decoding additional information embedded in a print, a method of controlling the image processing apparatus, and a storage medium.

Description of the Related Art

There is known an electronic watermark technique for embedding additional information other than image information in an image (hereinafter referred to as "multiplexing"). In the electronic watermark technique, for example, in an image, such as a photograph and a picture, additional information, such as a name of the author and use permission information, is multiplexed such that the additional information is difficult to be visually recognized. On the other hand, there is a case where additional information is multiplexed such that the additional information appears on a white background so as to enhance the accuracy of extracting the additional information from an image or use the additional information as a check character in a ground pattern.

As a method of multiplexing additional information in an image, there is known a technique for modulating pixel values in a local area of an image and synthesizing a pattern image meaning additional information (hereinafter referred to as the "encoded pattern") with the image. In Japanese Laid-Open Patent Publication (Kokai) No. 2000-305429, an image is divided into units of blocks each having 16 pixels (4×4 pixels), and pixel values of 8 pixels as a half of the 16 pixels are modulated in a + direction while pixel values of 8 pixels as the remaining half are modulated in a − direction. The image with which the encoded patterns are thus synthesized is printed, for example, by a printer after being subjected to halftone processing. The additional information existing on the print generated as described above is extracted by analyzing a scanned image of the print and executing decoding processing.

However, when the halftone processing is performed on the encoded patterns, some of the patterns are degraded in reproducibility. For example, in a configuration using a dither method as the halftone processing, in a case where a screen angle of a color plane with which an encoded pattern is synthesized and an angle of the encoded pattern match each other, the encoded pattern disappears. Further, in a configuration using the error diffusion method which does not have specific frequency components and angles, a plurality of patterns are not uniformly reproduced depending on an error diffusion direction. If some of the patterns are degraded in reproducibility as described above, a case occurs where some patterns can be decoded but the other patterns cannot be decoded, finally causing a problem of failure of the decoding

SUMMARY OF THE INVENTION

The present invention provides an image processing apparatus having a mechanism that is capable of preventing failure in decoding additional information embedded in a print.

In a first aspect of the present invention, there is provided an image processing apparatus that performs image processing for generating a print in which additional information is embedded, including a setting unit configured to set a halftone pattern used for halftone processing out of a plurality of halftone patterns, a determination unit configured to determine whether or not, in a case where the set halftone pattern is used for the halftone processing, encoded patterns generated based on the additional information can be uniformly reproduced from a color plane with which the encoded patterns are synthesized, and a control unit configured to perform, in a case where it is determined by the determination unit that the encoded patterns cannot be uniformly reproduced, a warning notification for notifying before outputting a print in which the additional information is embedded, a user that the print is a print which can cause failure in decoding the additional information.

In a second aspect of the present invention, there is provided a method of controlling an image processing apparatus that performs image processing for generating a print in which additional information is embedded, including setting a halftone pattern used for halftone processing out of a plurality of halftone patterns, determining whether or not, in a case where the set halftone pattern is used for the halftone processing, encoded patterns generated based on the additional information can be uniformly reproduced from a color plane with which the encoded patterns are synthesized, and performing, in a case where it is determined that the encoded patterns cannot be uniformly reproduced, a warning notification for notifying before outputting a print in which the additional information is embedded, a user that the print is a print which can cause failure in decoding the additional information.

According to the present invention, it is possible to prevent failure in decoding additional information embedded in a print.

Further features of the present invention will become apparent from the following description of exemplary embodiments (with reference to the attached drawings).

BRIEF DESCRIPTION OF THE DRAWINGS

FIG. 4A is a flowchart of a multiplexing control process performed by the additional information-multiplexing apparatus appearing in FIG. 1A.

FIGS. 6A and 6B are diagrams useful in explaining a method of calculating pixel values when the additional information-multiplexing apparatus appearing in FIG. 1A synthesizes an encoded pattern.

FIG. 9 is a diagram showing an example of halftone patterns which can be used by the image forming apparatus appearing in FIG. 1A.

FIGS. 13A and 13B are diagrams each showing an example of a HPF having directionality of a specific frequency vector.

FIGS. 16A to 16C are diagrams useful in explaining reproducibility of an encoded pattern.

DESCRIPTION OF THE EMBODIMENTS

Figure 1A:
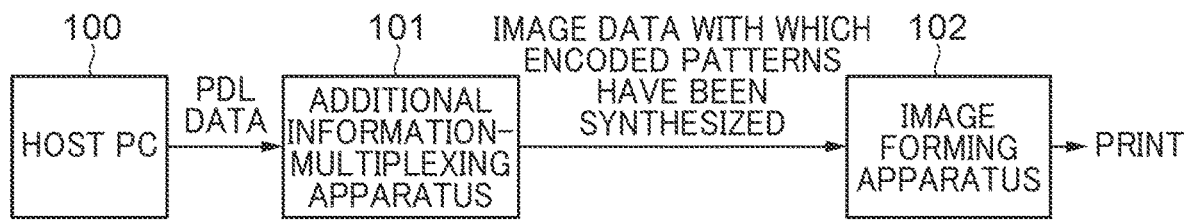
FIGS. 1A and 1B are diagrams useful in explaining multiplexing of additional information and extraction of the additional information in the present embodiment.

The present invention will now be described in detail below with reference to the accompanying drawings showing embodiments thereof. Note that the present invention is not limited to the embodiment described below, and not all combinations of features described in the embodiment are absolutely essential to the solution according to the invention. Note that the same components are denoted by the same reference numerals, and description thereof is omitted.

Figure 1B:
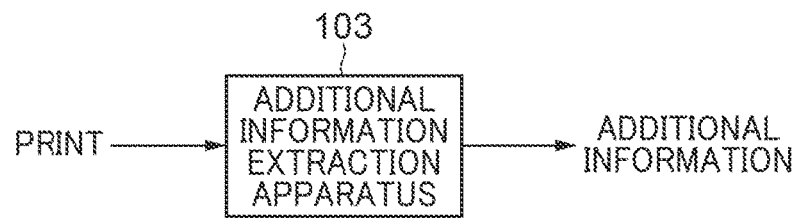

FIGS. 1A and 1B are diagrams useful in explaining multiplexing of additional information and extraction of the additional information in the present embodiment.

In the present embodiment, multiplexing of additional information is performed by a host PC 100, an additional information-multiplexing apparatus 101, and an image forming apparatus 102, all appearing in FIG. 1A.

The host PC 100 converts an image or document data into PDL data using a printer driver 212, described hereinafter with reference to FIG. 2, and transmits the PDL data to the additional information-multiplexing apparatus 101 via a network 240, described hereinafter with reference to FIG. 2. Note that the PDL is an abbreviation of Page Description Language. The PDL data includes ON/OFF information of a multiplexing function, additional information, and the like. Note that details of processing performed by the host PC 100 will be described hereinafter.

Upon receipt of the PDL data from the host PC 100, the additional information-multiplexing apparatus 101 performs rasterization processing on the PDL data to generate image data in bitmap format. Next, the additional information-multiplexing apparatus 101 determines whether the multiplexing function is set to ON or OFF. For example, in a case where the multiplexing function is set to OFF, the additional information-multiplexing apparatus 101 transmits the image data generated by the rasterization processing to the image forming apparatus 102 via the network 240. On the other hand, in a case where the multiplexing function is set to ON, the additional information-multiplexing apparatus 101 encodes the additional information to binary data expressed by a binary number and converts the binary data into encoded patterns. Further, the additional information-multiplexing apparatus 101 synthesizes the encoded patterns with the image data generated by the rasterization processing. The additional information-multiplexing apparatus 101 transmits the image data in which the encoded patterns have been synthesized to the image forming apparatus 102 via the network 240. Note that details of processing performed by the additional information-multiplexing apparatus 101 will be described hereinafter.

The image forming apparatus 102 converts the received image data into image data for printing and performs print processing based on the image data for printing. With this, a print in which the additional information is multiplexed is generated.

Further, in the present embodiment, extraction of the additional information is performed by an additional information extraction apparatus 103 appearing in FIG. 1B.

The additional information extraction apparatus 103 reads a print to generate scanned image data of the print or receives image data obtained through photographing via the network 240. In a case where additional information is multiplexed with image data acquired as described above, the additional information extraction apparatus 103 extracts encoded patterns. Further, the additional information extraction apparatus 103 converts the extracted encoded patterns into binary data expressed by a binary number and decodes the binary data to the original additional information. As a result, it is possible to extract the additional information from the print in which the additional information is multiplexed.

Next, the host PC 100 in the present embodiment will be described.

Figure 2:
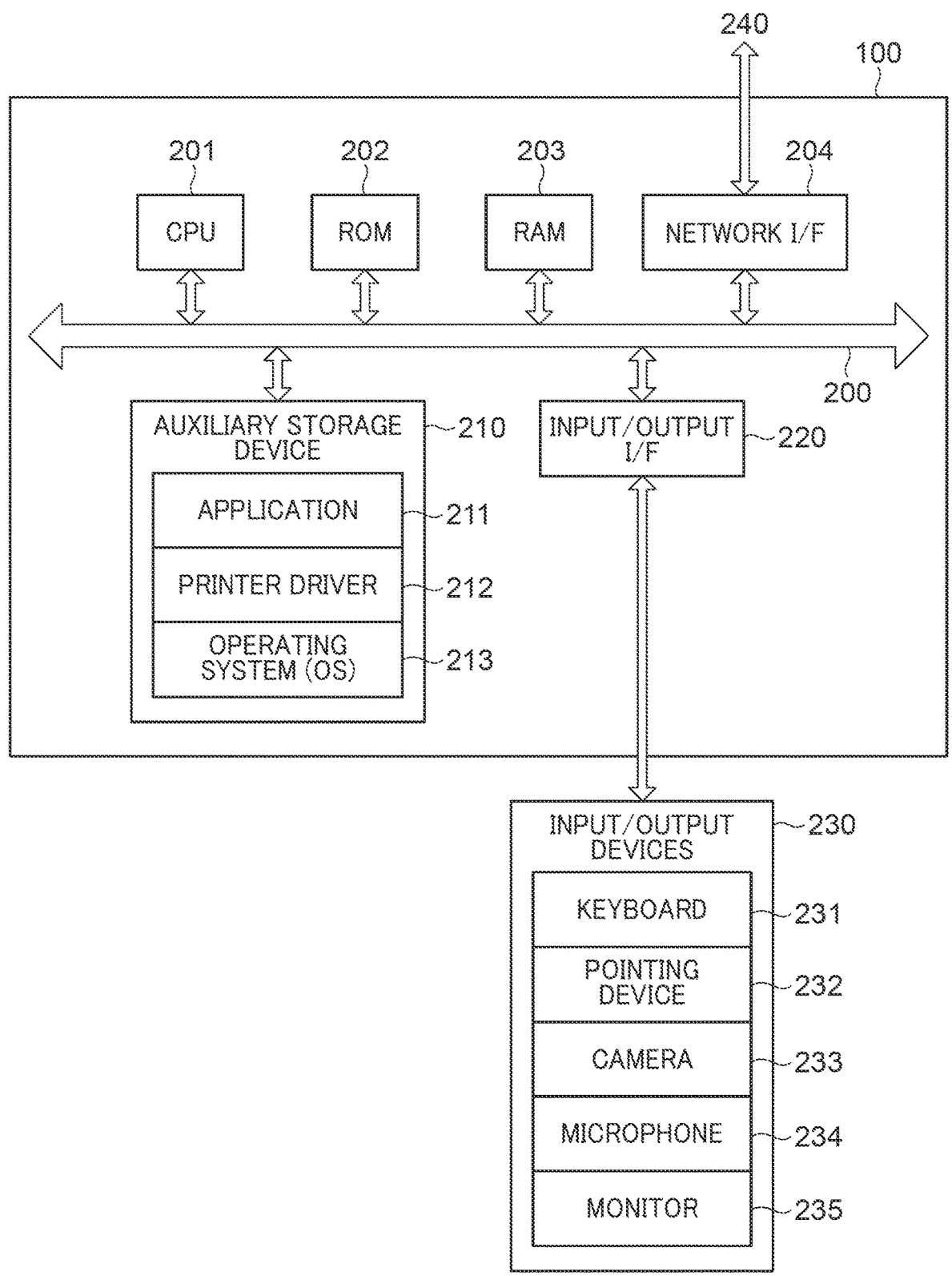
FIG. 2 is a schematic block diagram showing a hardware configuration of a host PC appearing in FIG. 1A.

FIG. 2 is a schematic block diagram showing a hardware configuration of the host PC 100 appearing in FIG. 1. Referring to FIG. 2, the host PC 100 includes a central processing unit (CPU) 201, a read only memory (ROM) 202, a random access memory (RAM) 203, a network interface 204, an auxiliary storage device 210, and an input/output interface 220. These components are interconnected via an internal bus 200.

The CPU 201 controls the overall operation of the host PC 100 according to programs stored in the ROM 202, the RAM 203, and the auxiliary storage device 210. The ROM 202 stores a variety of programs. The RAM 203 is used as a work area when the CPU 201 performs a variety of processes. The auxiliary storage device 210 stores an application 211, the printer driver 212, an operating system (OS) 213, and so forth.

The network interface 204 is an interface used by the host PC 100 to transmit and receive data to and from an external apparatus connected to the network 240, for example, the additional information-multiplexing apparatus 101. To the input/output interface 220, input/output devices 230 are connected. The input/output devices 230 include, for example, a keyboard 231, a pointing device 232, a camera 233, a microphone 234, and a monitor 235. The keyboard 231 and the pointing device 232 are input devices used by a user to input a variety of instructions to the host PC 100. The camera 233 has a photographing function. The microphone 234 has a sound collection function. Note that in a case where the host PC 100 has the photographing function and the sound collection function, the camera 233 and the microphone 234 are not required to be connected to the input/output interface 220. The monitor 235 displays a variety of screens based on data for display acquired via the input/output interface 220.

Figure 19:
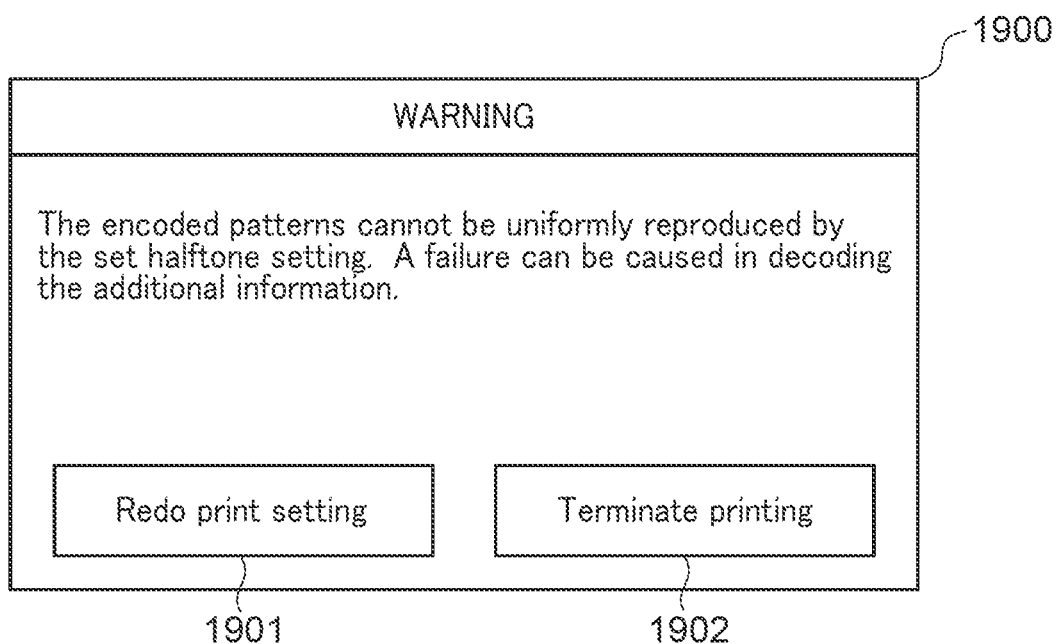
FIG. 19 is a diagram showing an example of a warning screen displayed on a monitor appearing in FIG. 2.

Here, the operation of the printer driver 212 will be described. When the printer driver 212 receives a print instruction from the OS 213, the printer driver 212 displays a print setting screen of the printer driver 212 on the monitor 235. The printer driver 212 stores print settings information input by the user in the RAM 203. The print settings information includes, for example, the ON/OFF information of the multiplexing function, the additional information, color component information of the encoded patterns, and image processing settings information, described hereinafter. The color component information of the encoded patterns is information indicating a color plane with which the encoded patterns are to be synthesized. Further, the printer driver 212 determines whether or not the encoded patterns can be uniformly reproduced based on the formation of the encoded patterns, the color component information of the encoded patterns, and the image processing settings information. Based on a result of the determination, the monitor 235 displays a warning screen 1900, described hereinafter with reference to FIG. 19, for prompting a user to select whether to set again the print settings information or to stop printing. With this, it is possible to prevent a print from which additional information cannot be decoded from being output. Note that details of processing will be described hereinafter. Further, the printer driver 212 generates PDL data according to a graphic device interface (GDI) command given from the OS 213 and stores the generated PDL data in the RAM 203. The generated PDL data is transmitted to the additional information-multiplexing apparatus 101 via the network interface 204.

Next, the additional information-multiplexing apparatus 101 in the present embodiment will be described.

Figure 3:
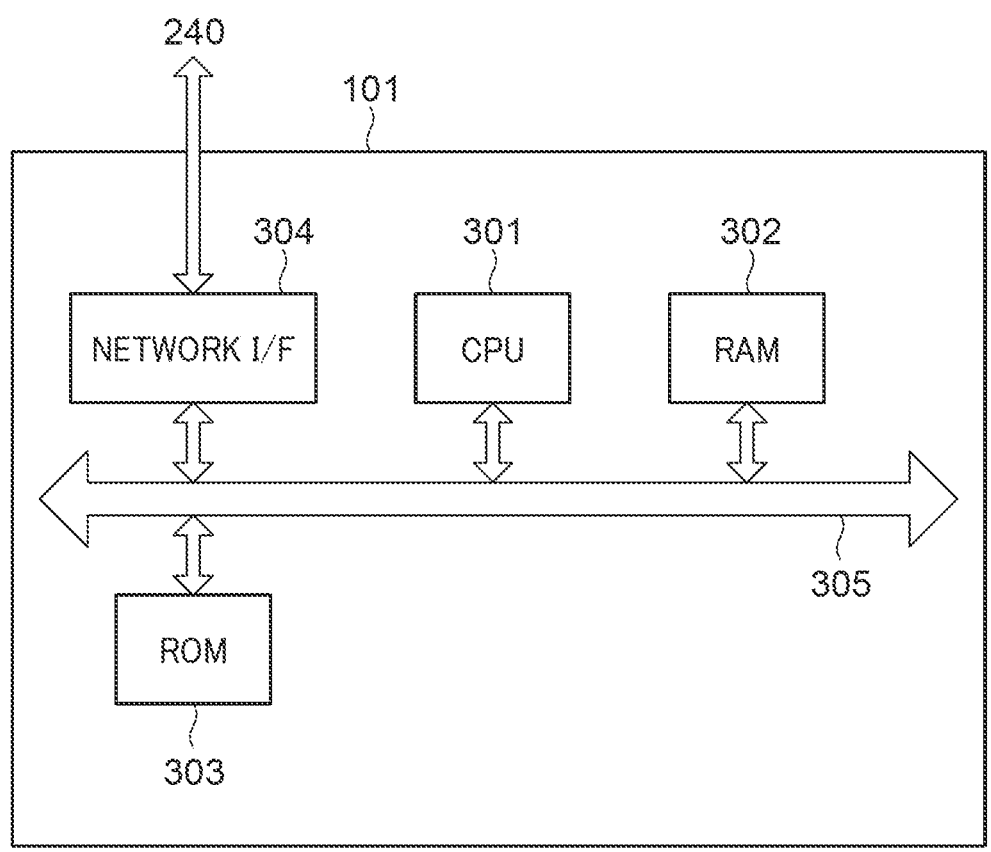
FIG. 3 is a schematic block diagram showing a hardware configuration of an additional information-multiplexing apparatus appearing in FIG. 1A.

FIG. 3 is a schematic block diagram showing a hardware configuration of the additional information-multiplexing apparatus 101 appearing in FIG. 1. The additional information-multiplexing apparatus 101 includes a CPU 301, a RAM 302, a ROM 303, and a network interface 304. These components are interconnected via an internal bus 305.

The CPU 301 controls the overall operation of the additional information-multiplexing apparatus 101. The RAM 302 is used as a work area when the CPU 301 executes a variety of commands. The ROM 303 stores, for example, programs executed by the CPU 301 when the additional information-multiplexing apparatus 101 is started up and configuration data of the additional information-multiplexing apparatus 101. The network interface 304 is used by the additional information-multiplexing apparatus 101 to transmit and receive data to and from external apparatuses connected to the network 240, for example, the host PC 100 and the image forming apparatus 102. For example, when PDL data is received from the host PC 100, the additional information-multiplexing apparatus 101 stores the PDL data in the RAM 302 and executes a multiplexing control process described hereinafter with reference to FIGS. 4A and 4B.

Figure 4B:
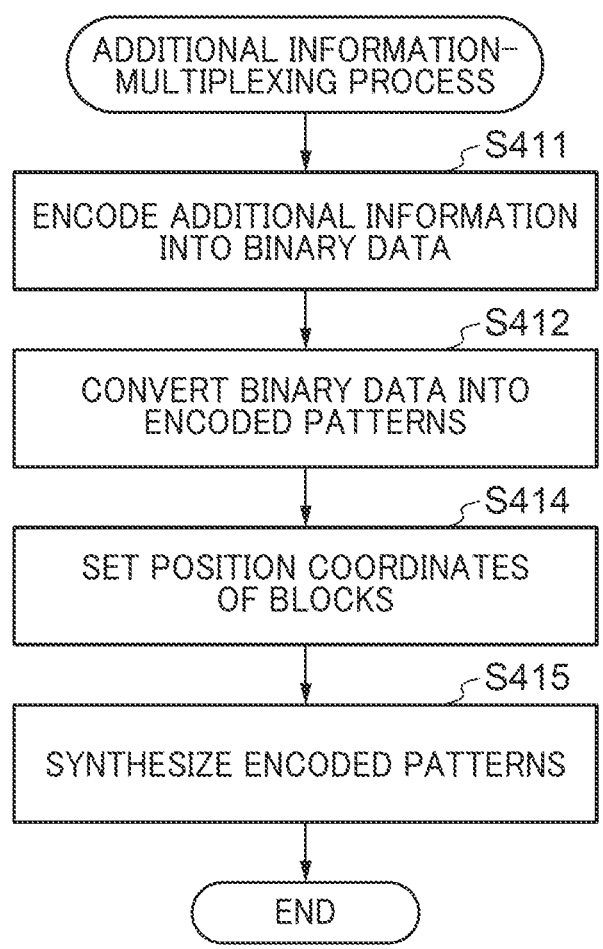
FIG. 4B is a flowchart of an additional information-multiplexing process executed in a step of the multiplexing control process in FIG. 4A.

FIGS. 4A and 4B are flowcharts of the multiplexing control process performed by the additional information-multiplexing apparatus 101 appearing in FIG. 1. The multiplexing control process in FIGS. 4A and 4B is realized by the CPU 301 that executes the program stored in the ROM 303. FIG. 4A shows the whole multiplexing control process.

Referring go FIG. 4A, first, the CPU 301 analyzes the PDL data read out from the RAM 302 (step S401). Based on the analysis, the CPU 301 generates image data in bitmap format and attribute data. The image data in bitmap format is image data in the RGB color space (hereinafter referred to as the "RGB image data"). The attribute data is data generated for each pixel based on a type of an object drawing command. The attribute data is determined according to the following standard: Specifically, the attribute data of each of pixels in an area specified by a character drawing command (a character type and a character code) is determined as a character attribute. The attribute data of each of pixels in an area specified by a line drawing command (a coordinate point, a length, and a thickness) is determined as a line attribute. The attribute data of each of pixels in an area specified by a graphic drawing command (a rectangle, a shape, and a coordinate point) is determined as a graphic attribute. The attribute data of each of pixels in an area specified by an image drawing command (set of points) is determined as an image attribute.

Further, the CPU 301 acquires the print settings information from the PDL data and stores the print settings information in the RAM 302. As mentioned hereinabove, the print settings information includes, for example, the ON/OFF information of the multiplexing function, the additional information, the color component information of the encoded patterns, and the image processing settings information. The image processing settings information indicates, for example, a halftone pattern used for halftone processing, described hereinafter. The halftone pattern is, for example, a halftone pattern designated by a user who has instructed transmission of the PDL data from the host PC 100 or a default halftone pattern.

Then, the CPU 301 performs color space conversion for converting the generated RGB image data into image data in the CMYK color space (hereinafter referred to as the "CMYK image data") (step S402). In this color space conversion, a four-dimensional look-up table (LUT) is used which enables conversion of the RGB image data into the CMYK image data which makes it possible to form desired color (Lab) values on a sheet. The four-dimensional LUT can be obtained by experiment or simulation in advance or can be calculated, for example, by using a formula. The CMYK image data obtained in the step S402 is stored in the RAM 302.

Then, the CPU 301 determines whether or not the multiplexing function is set to ON, based on the ON/OFF information of the multiplexing function, included in the print settings information stored in the RAM 302 (step S403). If it is determined in the step S403 that the multiplexing function is set to ON, the CPU 301 acquires the additional information from the RAM 302 (step S404). Then, the CPU 301 performs an additional information-multiplexing process described below with reference to FIG. 4B (step S405).

FIG. 4B is a flowchart of the additional information-multiplexing process executed in the step S405 in FIG. 4A.

Referring to FIG. 4B, the CPU 301 performs processing for encoding the acquired additional information (step S411). In the encoding processing, a number or character indicated by the additional information is converted into binary data which is data of a binary number expressed only by "0" and "1", based on a character code. In the character code, information indicating binary data to which a number or character is to be converted is defined. Here, a case will be described, by way of example, where the processing for encoding additional information describing "hello" is performed based on the "Shift JIS" which is a character encoding standard. In this case, the additional information describing "hello" is converted into binary data "0110100001100101011011000110110001101111".

Figure 5A:
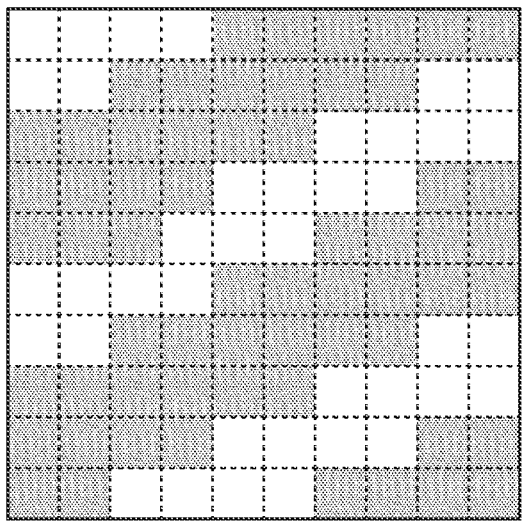
FIGS. 5A and 5B are diagrams each showing an example of an encoded pattern to be synthesized with image data by the additional information-multiplexing apparatus appearing in FIG. 1A.
Figure 5B:
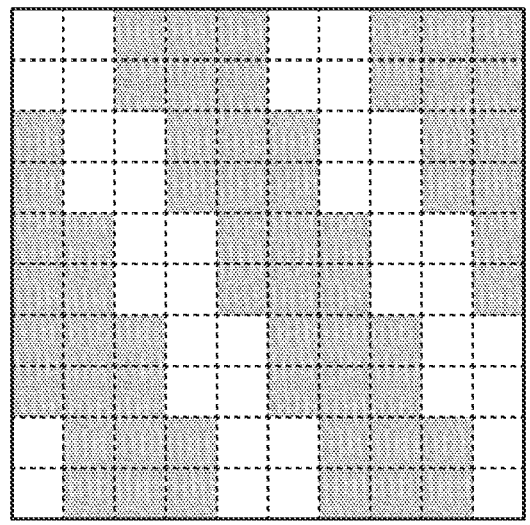

Then, the CPU 301 converts the values (each of which is "0" or "1") forming the binary data obtained in the step S411 into encoded patterns (step S412). Here, the encoded patterns to be synthesized with the image data will be described with reference to FIGS. 5A and 5B. FIG. 5A shows an encoded pattern representing the value of "0". This encoded pattern is formed by 10 px (pixels)×10 px. FIG. 5B shows an encoded pattern representing the value of "1". This encoded pattern is also formed by 10 px×10 px.

By synthesizing the encoded pattern shown in FIG. 5A and the encoded pattern shown in FIG. 5B with the image data, the image data has different periodicities in units of blocks each of 10 px×10 px. Note that the method of synthesizing the encoded patterns will be described hereinafter. If an encoded pattern array having two periodicities can be identified with respect to a print of the image data synthesized with these encoded patterns, by performing frequency analysis on image data obtained by reading this print, it is possible to read binary data comprised of "0" and "1".

Then, the CPU 301 acquires the CMYK image data obtained in the step S402 and color component information of the encoded patterns included in the print settings information, from the RAM 302. The CPU 301 sets position coordinates of each block with which each encoded pattern is to be synthesized, for an image of a color plane indicated by the color component information of the encoded patterns, in the CMYK image data (step S414). For example, let it be assumed that the image size has a longitudinal length of 640 px and a lateral width of 480 px, and further that the block size is the size of the encoded pattern, i.e. has a longitudinal length of 10 px and a lateral width of 10 px. In this case, the number of blocks in the longitudinal direction is equal to 640÷10=64 blocks, and the number of blocks in the lateral direction is equal to 480÷10=48 blocks. Further, the total number of blocks is equal to 64×48=3072 blocks. In the step S414, for example, upper left coordinates of a target block are set as the position coordinates of the block.

Here, the size of the additional information which can be expressed will be described. The additional information-multiplexing apparatus 101 multiplexes the same data in a plurality of locations such that the additional information extraction apparatus 103 can extract the additional information even by reading only part of a print. For example, assuming that the same additional information is multiplexed at 32 locations, in a case where the number of blocks of the whole image is 3072 blocks as calculated in the step S414, the additional information can be expressed in a size using 3072÷32=96 blocks. Since one block is 1-bit information of "0" or "1", the additional information can handle information of 96 bits. However, to make clear the start position of 96 bits, 8 bits of "11111111" which is not used for expression of a character in the Shift JIS are caused to be included at the start of characters. Therefore, it is possible to define additional information by data of 96−8=88 bits. In the present embodiment, in the step S411, binary data within a size of 88 bits and comprised of "0" or "1" is obtained.

Then, the CPU 301 synthesizes the encoded patterns obtained in the step S412 with the CMYK image data obtained in the step S402 (step S415), at position coordinates of each block, which are set in the step S414. Here, a method of calculating the pixel values when synthesizing the encoded patterns will be described with reference to FIGS. 6A and 6B. In the present embodiment, a case will be described where a print instruction has been given for synthesizing the encoded patterns with a Yellow plane (hereinafter referred to as the "Y plane") having high brightness components in the CMYK color space so as to make the encoded patterns inconspicuous. FIG. 6A corresponds to the encoded pattern shown in FIG. 5A, and FIG. 6B corresponds to the encoded pattern shown in FIG. 5B. Values in the figures each indicate a pixel value to be added to a Yellow pixel value of the CMYK image data obtained in the step S402. For example, in a case where the pixel values of the Y plane with which the encoded patterns are to be synthesized are uniformly 20, a pixel value of a pixel having a value of 0 in FIG. 6 is changed to a value of 20+0=20, and a pixel value of a pixel having a value of 72 in FIG. 6 is changed to 20+72=92. Assuming that the pixel values of the Y plane of a block with which the encoded pattern is to be synthesized are equal to or larger than 184, 184+72=256 is calculated, which exceeds the maximum value of 8 bits. In this case, the pixel value is clipped to 255 as the maximum value of 8 bits. By synthesizing the encoded patterns with CMYK image data as described above, the resulting CMYK image data has a predetermined period of repetition in the encoded patterns in units of blocks each having 10 px×10 px on the Y plane. The CMYK image data with which the encoded patterns have been synthesized is stored in the RAM 302, and the multiplexing control process is terminated. After that, the CMYK image data and the image processing settings information are transmitted to the image forming apparatus 102.

On the other hand, if it is determined in the step S403 that the multiplexing function is set not to ON but to OFF, the multiplexing control process is immediately terminated. Thereafter, the CMYK image data and the image processing settings information, which are stored in the RAM 302, are transmitted to the image forming apparatus 102.

Note that although in the present embodiment, the description is given of the configuration in which the additional information acquired from the PDL data is converted into the encoded patterns, and these encoded patterns are synthesized with the CMYK image data, this is not limitative. For example, not the additional information acquired from the PDL data, but the additional information stored in the ROM 303 of the additional information-multiplexing apparatus 101 in advance can be converted into the encoded patterns, and these encoded patterns can be synthesized with the CMYK image data.

Next, the image forming apparatus 102 in the present embodiment will be described.

Figure 7:
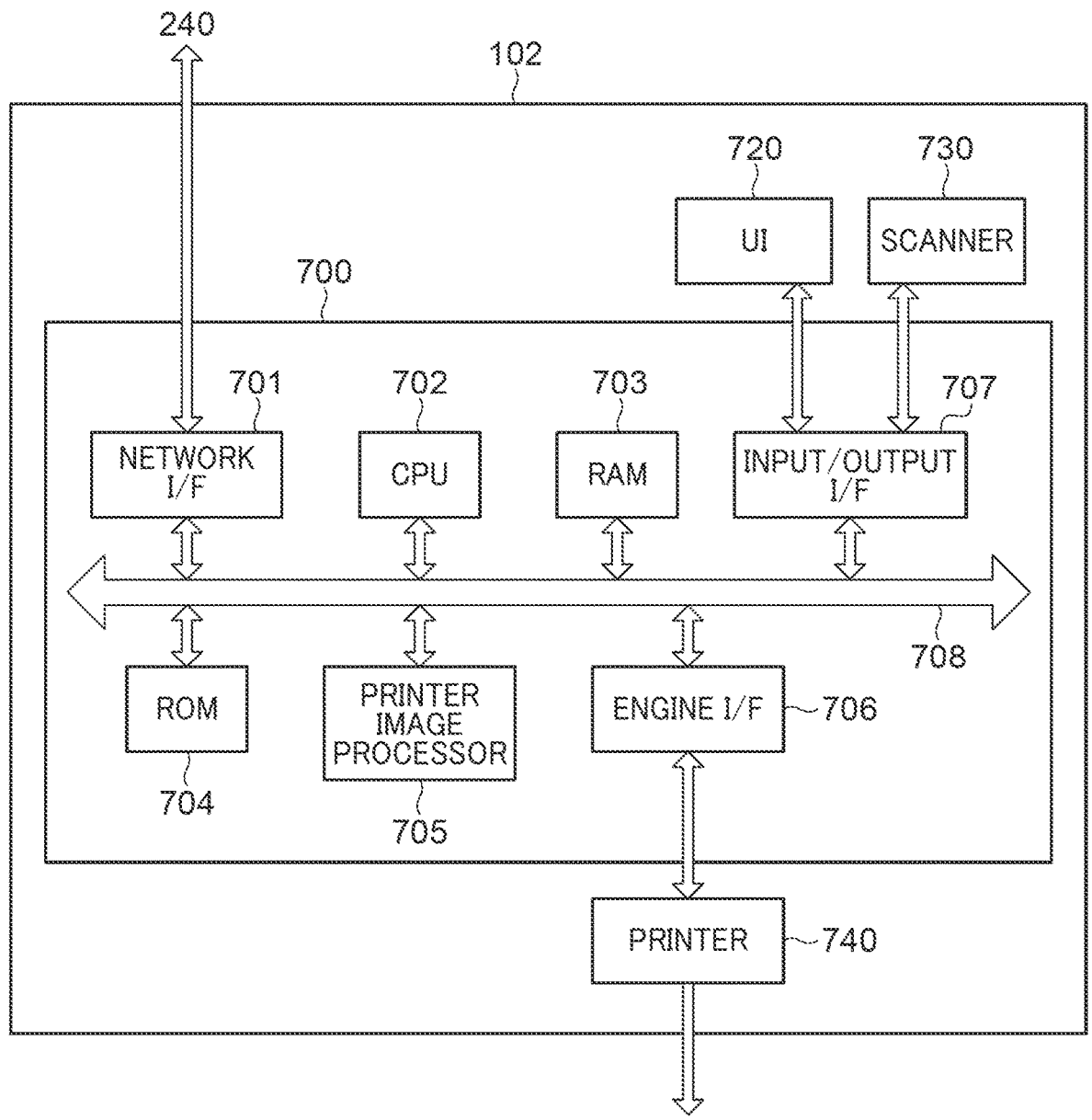
FIG. 7 is a schematic block diagram showing a hardware configuration of an image forming apparatus appearing in FIG. 1A.

FIG. 7 is a schematic block diagram showing a hardware configuration of the image forming apparatus 102 appearing in FIG. 1. Referring to FIG. 7, the image forming apparatus 102 includes a controller 700, a user interface 720, a scanner 730, and a printer 740. The controller 700 is connected to the user interface 720, the scanner 730, and the printer 740. Further, the controller 700 includes a network interface 701, a CPU 702, a RAM 703, a ROM 704, a printer image processor 705, an engine interface 706, and an input/output interface 707. These components are interconnected via an internal bus 708.

The network interface 701 is used by the image forming apparatus 102 to transmit and receive data to and from an external apparatus connected to the network 240, for example, the additional information-multiplexing apparatus 101. The CPU 702 controls the overall operation of the image forming apparatus 102. The RAM 703 is used as a work area when the CPU 702 executes a variety of commands. The ROM 704 stores, for example, programs executed by the CPU 702 when the image forming apparatus 102 is started up and configuration data of the controller 700. The printer image processor 705 converts image data or document data, which are received from an external apparatus, into print data. The engine interface 706 transfers the print data to the printer 740. The input/output interface 707 is used by the controller 700 to transmit and receive data to and from the user interface 720 and the scanner 730.

The printer 740 prints an image on a sheet based on print data. The user interface 720 is used by a user to give instructions including, for example, selection of sheet information to the image forming apparatus 102. The scanner 730 reads a print and generates image data of the read print.

Here, the outline of the operation of the controller 700 will be described.

Figure 8:
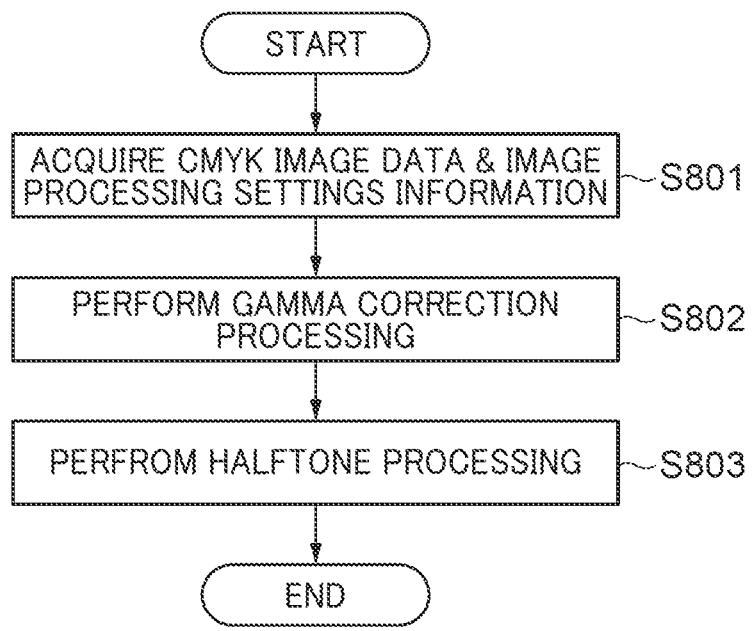
FIG. 8 is a flowchart of a control process performed by a controller appearing in FIG. 7.

FIG. 8 is a flowchart of a control process performed by the controller 700 appearing in FIG. 7. The control process in FIG. 8 is realized by the CPU 702 of the controller 700 that executes a program stored in the ROM 704. The control process in FIG. 8 is executed when the additional information-multiplexing apparatus 101 executes the above-described multiplexing control process to generate CMYK image data and transmits the CMYK image data and the image processing settings information to the image forming apparatus 102.

Referring to FIG. 8, first, the CPU 702 acquires the CMYK image data and the image processing settings information from the additional information-multiplexing apparatus 101 via the network interface 701 (step S801). The image processing settings information indicates a halftone pattern used in the halftone processing, as mentioned above.

Here, a case where the user switches the halftone pattern will be described. First, candidates of the halftone pattern in the present embodiment will be described with reference to FIG. 9.

FIG. 9 is a diagram showing an example of halftone patterns which can be used by the image forming apparatus appearing in FIG. 1A. Referring to FIG. 9, a halftone pattern 1 has a low screen ruling, a halftone pattern 2 has a high screen ruling, and a halftone pattern 3 has a higher screen ruling than the halftone pattern 2. The image forming apparatus 102 can switch between these three halftone patterns. In the present embodiment, the halftone pattern 1 is a default halftone pattern having a low screen ruling, and the halftone pattern 2 is a default halftone pattern having a high screen ruling.

Incidentally, in the dither method using a threshold matrix, basically, as the screen ruling is higher, the image data after halftone processing is formed by a larger number of small dots. Therefore, the reproducibility of a character of small points or low signal values is improved, but the reproducibility of the dots themselves is made unstable so that the gradation of image part is degraded.

On the other hand, in the dither method using the threshold matrix, as the screen ruling is lower, the image data after halftone processing is formed by a smaller number of large dots. Therefore, the reproducibility of a character of small points or low signal values is degraded (e.g. made more jaggy), but the reproducibility of the dots themself is made stable so that the gradation of image part is improved. Thus, the screen ruling (reproducibility) and the gradation are in a trade-off relationship. The image forming apparatus 102 acquires the attribute data obtained in the step S401 from the additional information-multiplexing apparatus 101 and performs halftone processing based on the attribute data. For example, the image forming apparatus 102 performs the halftone processing by the dither method using a threshold matrix for a low screen ruling for areas of the image attribute in the image data. Further, the image forming apparatus 102 performs the halftone processing by the dither method using a threshold matrix for a high screen ruling for areas of the character attribute, areas of the line attribute, and areas of the figure attribute in the image data. By thus controlling the halftone processing according to the attribute, it is possible to eliminate the trade-off relation between the screen ruling and the gradation to thereby output a print having high image quality for each attribute.

For example, there is a case where a user has a concern about a jaggedness characteristic rather than the gradation, and as a result, selects the halftone pattern 2 having a higher screen ruling than the halftone pattern 1, for the default halftone pattern of the image part. Assuming a user's demand in view of such a situation, the image forming apparatus 102 holds a plurality of halftone patterns. Note that in the following description, a case will be described, by way of example, for ease of explanation, where the halftone pattern is not switched on an attribute-by-attribute basis, and only the default halftone pattern having the low screen ruling is used. That is, in the present embodiment, it is assumed that the halftone pattern 1 which is the default halftone pattern having the low screen ruling is set as the halftone pattern used for halftone processing.

Referring again to FIG. 8, the CPU 702 performs gamma correction processing on the CMYK image data acquired in the step S801 (step S802). The gamma correction processing is performed using a one-dimensional LUT such that the density characteristics become desired characteristics when printing on a recording sheet is performed based on the image data obtained by performing the halftone processing in a step S803, described hereinafter. The image data having been subjected to the gamma correction processing is stored in the RAM 703.

Then, the CPU 702 performs the halftone processing on the image data having been subjected to the gamma correction processing and stored in the RAM 703 (step S803). The image data having been subjected to the halftone processing is stored in the RAM 703, followed by terminating the present control process. After that, the printer 740 performs printing on a sheet based on the image data having been subjected to the halftone processing and stored in the RAM 703. With this, a print is generated. For example, in a case where the multiplexing function is set to ON, a print in which the additional information is multiplexed is generated.

Next, the additional information extraction apparatus 103 will be described.

Figure 10:
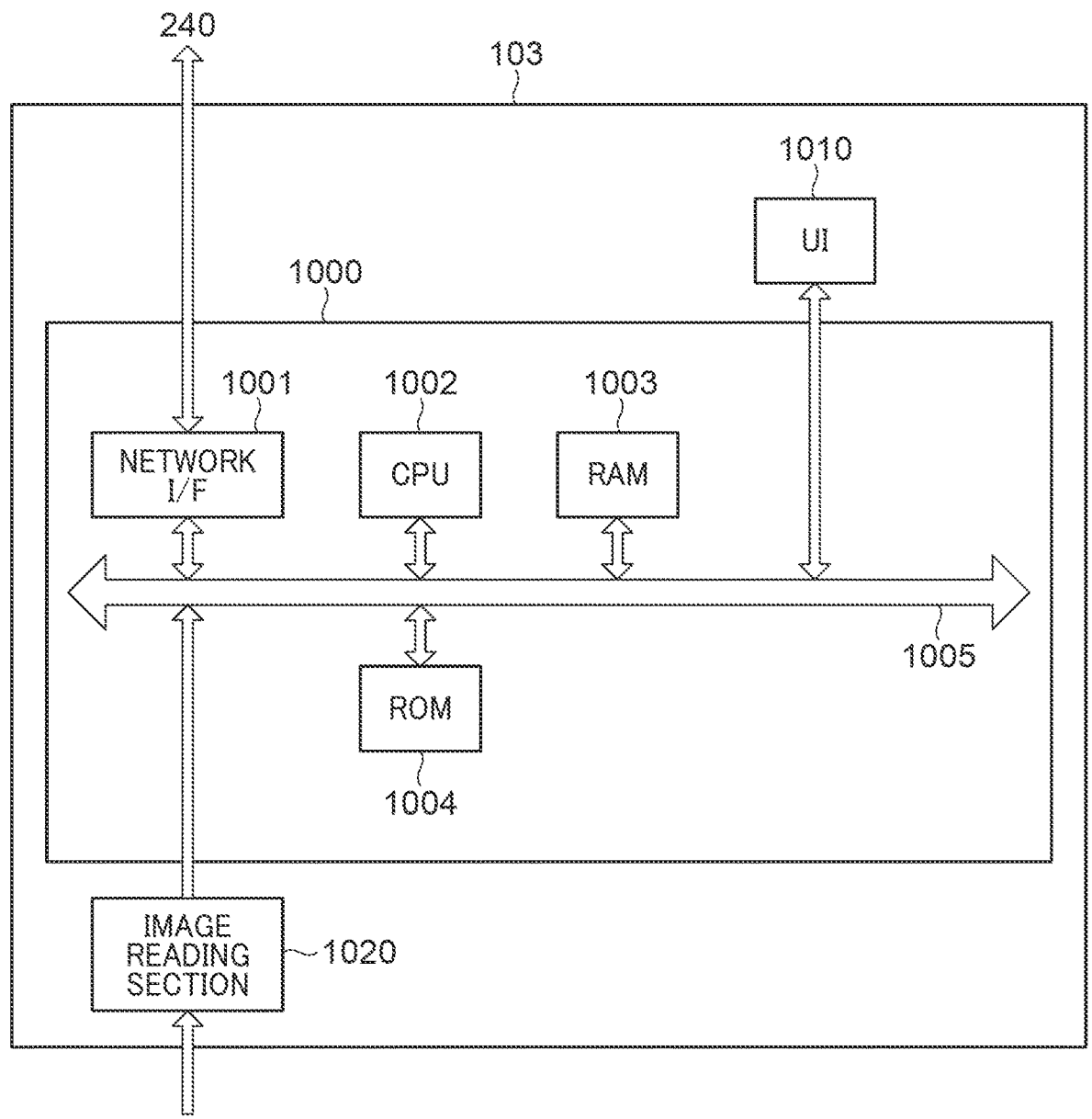
FIG. 10 is a schematic block diagram showing a hardware configuration of an additional information extraction apparatus appearing in FIG. 1B.

FIG. 10 is a schematic block diagram showing a hardware configuration of the additional information extraction apparatus 103 appearing in FIG. 1B. Referring to FIG. 10, the additional information extraction apparatus 103 includes an additional information extraction controller 1000, a user interface (UI) 1010, and an image reading section 1020. The additional information extraction controller 1000 is connected to the user interface 1010 and the image reading section 1020. Further, the additional information extraction controller 1000 includes a network interface 1001, a CPU 1002, a RAM 1003, and a ROM 1004. These components are interconnected via an internal bus 1005.

The additional information extraction controller 1000 extracts additional information from scanned image data generated by the image reading section 1020 that reads a print. The network interface 1001 is used by the additional information extraction apparatus 103 to transmit and receive data to and from an external apparatus connected to the network 240. The CPU 1002 controls the overall operation of the additional information extraction apparatus 103. The RAM 1003 is used as a work area when the CPU 1002 executes a variety of commands. The ROM 1004 stores, for example, programs executed by the CPU 1002 when the additional information extraction apparatus 103 is started up and configuration data of the additional information extraction controller 1000. The user interface 1010 is used by a user to operate the additional information extraction apparatus 103. The image reading section 1020 has a scan function. For example, when the user inputs an instruction for reading additional information multiplexed on a print, to the user interface 1010, the image reading section 1020 reads the print set for reading and generates scanned image data of the read print. The generated scanned image data is stored in the RAM 1003, and an additional information extraction process in FIG. 11 is executed.

Figure 11:
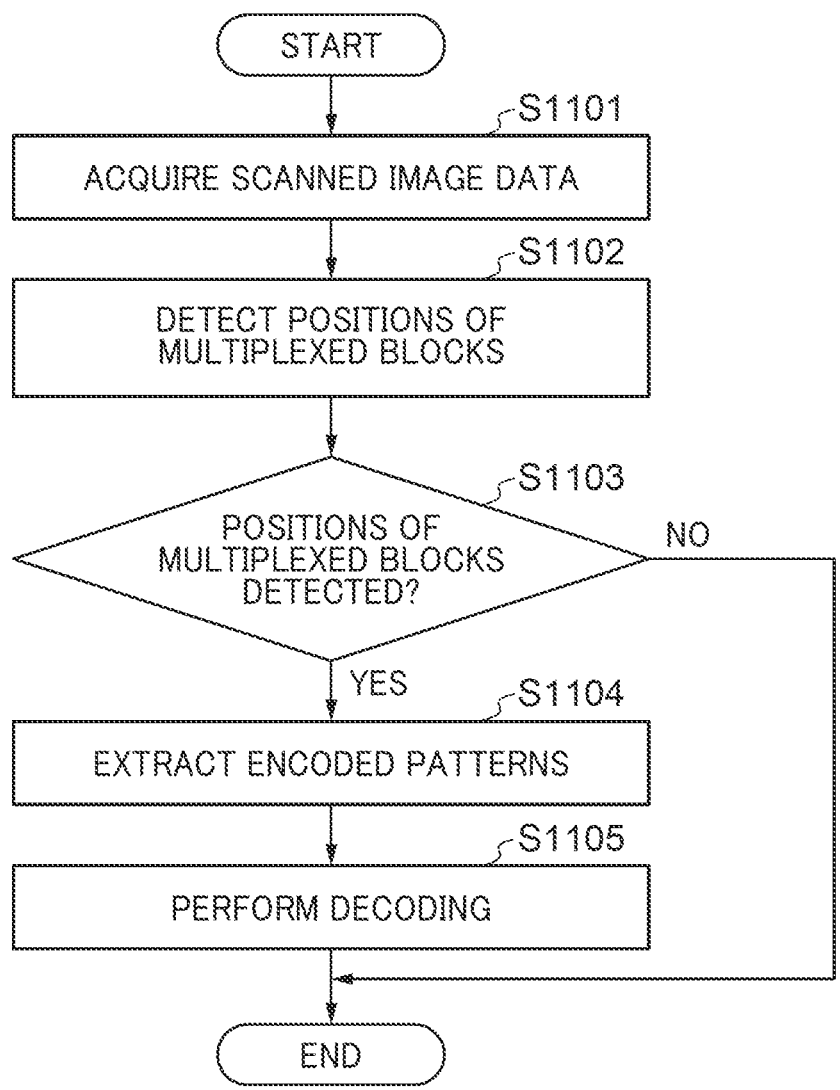
FIG. 11 is a flowchart of an additional information extraction process performed by the additional information extraction apparatus appearing in FIG. 1B.

FIG. 11 is a flowchart of the additional information extraction process performed by the additional information extraction apparatus 103 appearing in FIG. 1B. This additional information extraction process is realized by the CPU 1002 that executes a program stored in the ROM 1004.

Referring to FIG. 11, the CPU 1002 acquires scanned image data generated by the image reading section 1020 from the RAM 1003 (step S1101). Then, the CPU 1002 detects positions of multiplexed blocks which are blocks of the encoded patterns synthesized with the acquired scanned image data (step S1102). Here, a method of detecting the positions of the multiplexed blocks will be described with reference to FIGS. 12, 13A, 13B, 14A, and 14B.

Figure 12:
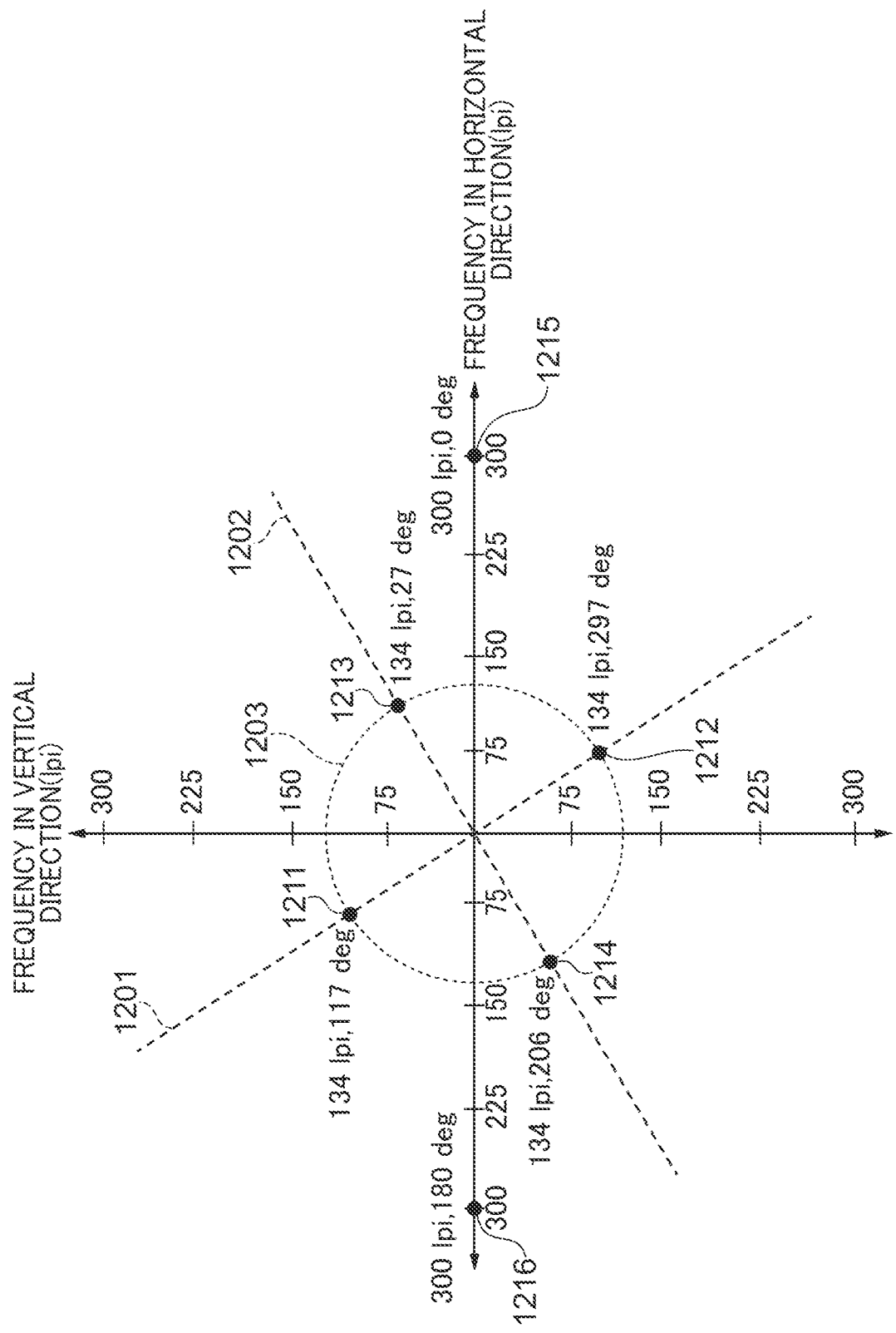
FIG. 12 is a schematic diagram showing differences in frequency characteristics in two-dimensional frequency regions on a Y plane in the present embodiment.

FIG. 12 is a schematic diagram showing differences in frequency characteristics in two-dimensional frequency regions on the Y plane in the present embodiment. A horizontal axis represents frequencies in a horizontal direction, and a vertical axis represents frequencies in a vertical direction. An origin as the center indicates a DC component, and a region farther from the origin indicates a higher-frequency region.

In FIG. 12, an area where the powers of the frequency components at 117 degrees and 297 degrees appear is indicated by a straight broken line 1201, and an area where the powers of the frequency components at 27 degrees and 206 degrees appear is indicated by a straight broken line 1202. Further, an area where the power of the frequency component of 134 lpi appears is indicated by a circular broken line 1203. That is, an intersection 1211 between the straight broken line 1201 and the circular broken line 1203 indicates a point where the power of the frequency component of 134 lpi at 117 degrees appears, and an intersection 1212 between the straight broken line 1201 and the circular broken line 1203 indicates a point where the power of the frequency component of 134 lpi at 297 degrees appears. Further, an intersection 1213 between the straight broken line 1202 and the circular broken line 1203 indicates a point where the power of the frequency component of 134 lpi at 27 degrees appears, and an intersection 1214 between the straight broken line 1202 and the circular broken line 1203 indicates a point where the power of the frequency component of 134 lpi at 206 degrees appears.

For example, in a case where the frequency component of the encoded pattern shown in FIG. 5A is 134 lpi at 117 degrees, a large power spectrum is generated at the intersection 1211. Further, in a case where the frequency component of the encoded pattern shown in FIG. 5B is 134 lpi at 27 degrees, a large power spectrum is generated at the intersection 1213. Thus, by detecting a point where a power spectrum equal to or larger than a predetermined threshold value is generated, it is possible to determine which of the encoded patterns is synthesized.

For example, in a case where the set halftone pattern is a pattern set to 300 lpi at 0 degrees, with which the encoded patterns can be uniformly reproduced, the frequency component of the Y plane, which is generated by the halftone processing, is generated at a point 1215. The halftone pattern set to 300 lpi at 0 degrees is a halftone pattern with which the encoded patterns shown in FIGS. 5A and 5B can be uniformly reproduced. Therefore, when the frequency of the scanned image data in which these encoded patterns are uniformly reproduced is analyzed, a large power spectrum is generated at the intersection 1211 and the intersection 1213. On the other hand, in a case where the set halftone pattern is a halftone pattern with which the encoded patterns cannot be uniformly reproduced, such as a halftone pattern set to 134 lpi at 117 degrees, the encoded pattern shown in FIG. 5A disappears. Therefore, a large power spectrum which is to be generated at the intersection 1211 is not generated, which makes it impossible to detect the encoded patterns.

FIGS. 13A and 13B are diagrams each showing an example of a high-pass filter (HPF) having a directionality of a specific frequency vector. The HPFs shown in FIGS. 13A and 13B each are also used as a space filter in detection of a frequency vector. That is, the space filter shown in FIG. 13A makes it possible to emphasize the frequency vector on the straight broken line 1201, and further, the space filter shown in FIG. 13B makes it possible to emphasize the frequency vector on the straight broken line 1202.

A case where a large power spectrum is generated on the frequency vector of the straight broken line 1201 in FIG. 12 by the encoded pattern shown in FIG. 5A will be described by way of example. In this case, although an amount of change in power spectrum is amplified by the space filter shown in FIG. 13A, an amount of change in power spectrum is hardly amplified by the space filter shown in FIG. 13B. That is, assuming that filtering is performed by arranging a plurality of space filters in parallel, the amount of change is amplified only when the space filter matching in the frequency vector is used but is hardly amplified when the other space filter is used. Therefore, it is possible to easily determine a frequency vector in which a large power spectrum is generated.

Although it is possible to extract the encoded pattern by determining frequency characteristics as described above, if positions from which the encoded pattern is to be extracted deviate from proper positions when determining the frequency characteristics, it is impossible to accurately extract the encoded pattern. Therefore, in the present embodiment, the positions of the multiplexed blocks in the acquired scanned image data are detected in the step S1102.

Figure 14A:
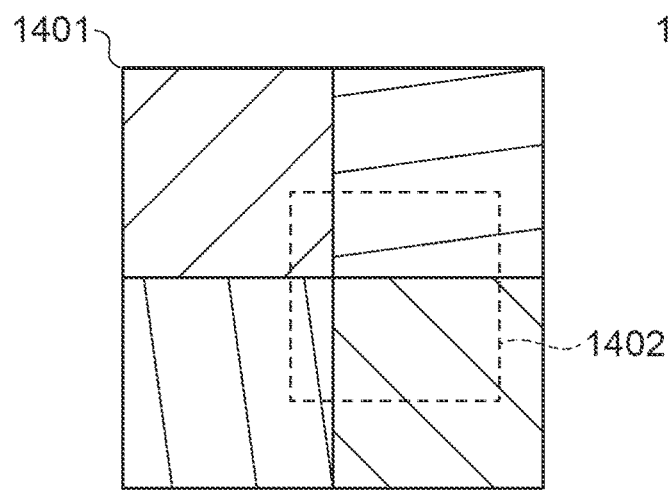
FIGS. 14A and 14B are diagrams useful in explaining detection of a multiplexed block in a step in FIG. 11.
Figure 14B:
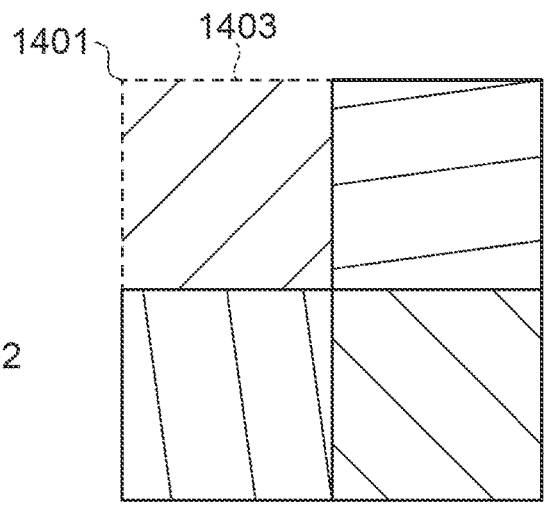

FIGS. 14A and 14B are diagrams useful in explaining detection of multiplexed blocks in the step S1102 in FIG. 11. An image 1401 is part of an image represented by the scanned image data, specifically, an image formed by four blocks of an encoded pattern. Areas 1402 and 1403 each indicate a target area for determining frequency characteristics. FIG. 14A shows a state in which the determination target area 1402 deviates from the position of a block of the encoded pattern. FIG. 14B shows a state in which the determination target area 1403 matches the position of a block of the encoded pattern. In a case where the determination target area 1403 matches the position of the block of the encoded pattern as shown in FIG. 14B, it is possible to accurately identify a frequency set in advance. On the other hand, in a case where the determination target area 1402 deviates from the position of the block of the encoded pattern as shown in FIG. 14A, the power spectrum of a specified frequency vector is lowered, and hence it is difficult to identify the frequency set in advance. The CPU 1002 detects the position of a multiplexed block corresponding to the block of the encoded pattern based on whether the power spectrum of the specified frequency vector is strong or weak. To this end, the CPU 1002 performs determination of the frequency characteristics on the acquired scanned image data while displacing the position of a block to thereby detect a multiplexed block. This is the multiplexed block detection method.

Referring again to FIG. 11, the CPU 1002 determines whether or not the positions of multiplexed blocks are detected (step S1103). If it is determined in the step S1103 that the positions of multiplexed blocks are not detected, the additional information extraction process is terminated. If it is determined in the step S1103 that the positions of multiplexed blocks are detected, the CPU 1002 extracts the synthesized encoded pattern with reference to each detected position using results of determination of the frequency characteristics (step S1104).

Figure 15:
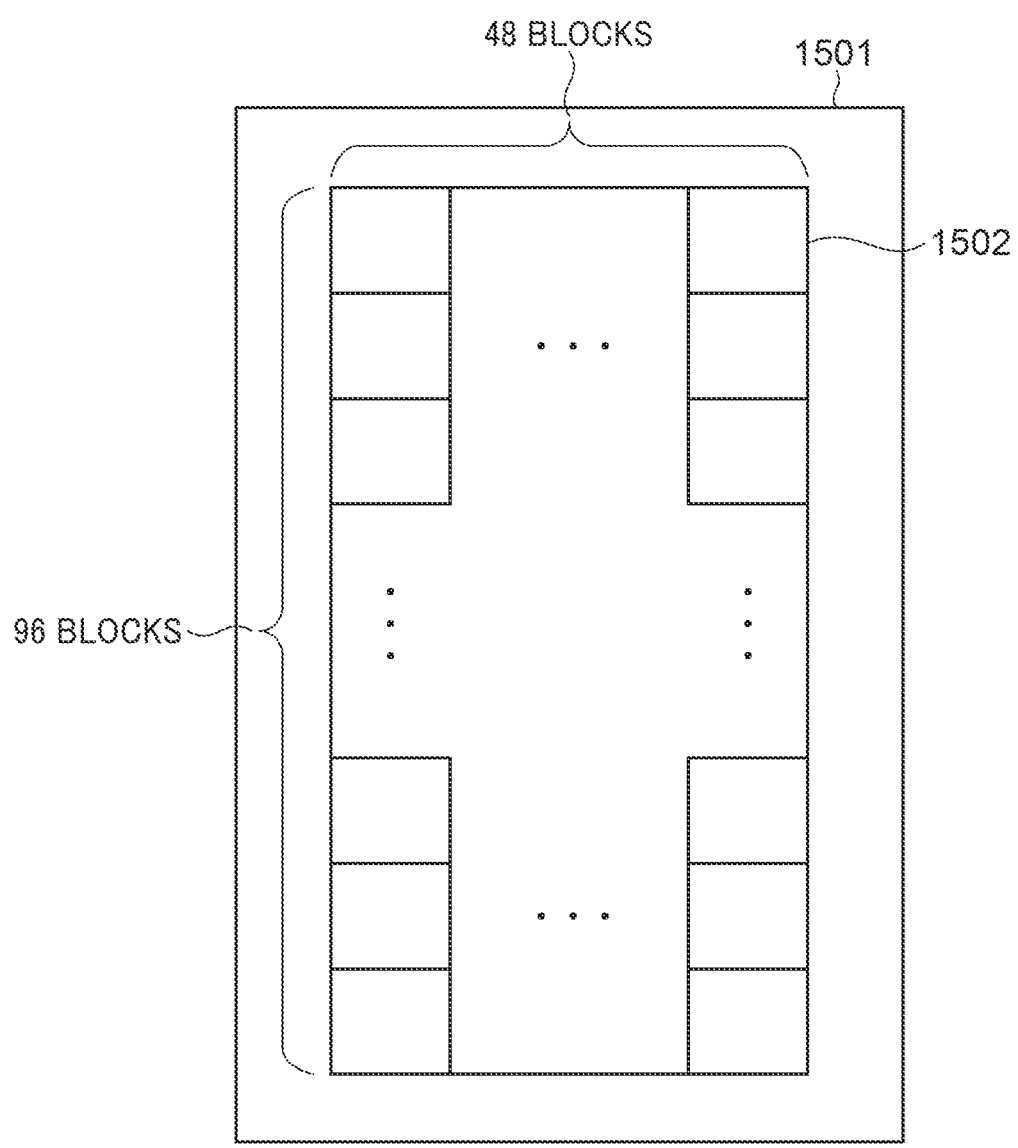
FIG. 15 is a diagram showing an example of a print in which additional information is multiplexed.

FIG. 15 is a diagram showing an example of a print 1501 in which additional information is multiplexed. Referring to FIG. 15, a block 1502 indicates a multiplexed block. The number of multiplexed blocks is a total of 3072 blocks formed by 48 blocks in the lateral direction and 96 blocks in the longitudinal direction. Let it be assumed that the additional information in FIG. 15 is encoded to "0" and "1" for each block and is synthesized as the encoded patterns. In the step S1104, the determination of the frequency characteristics is performed on a block-by-block basis with reference to each of the positions detected in the step S1102 while displacing the position through the 3072 blocks. In this case, one encoded pattern can be determined for each one block, and hence it is possible to extract data items of a total of 96 bits×32. Thus, by performing the determination of the frequency characteristics while displacing the position, it is possible to extract all encoded patterns. However, in the present embodiment, since the same 32 data items are synthesized as described above, the size of the additional information itself is 88 bits except "11111111" indicating the start of the data item.

Then, the CPU 1002 analyzes the extracted encoded patterns and decodes the encoded data item into the format of original additional information (step S1105). More specifically, the CPU 1002 converts the plurality of extracted encoded patterns into binary data expressed by a binary number and decodes the binary data to the original additional information based on the character codes. The decoded additional information is compared with correct answer data stored, for example, in an external server, whereby it is possible to identify the author of the additional information. When the step S1105 is completed, the additional information extraction process is terminated.

Incidentally, when the halftone processing is performed on the image data with which the encoded patterns have been synthesized, in the above-described control process in FIG. 8, this sometimes causes a problem that the encoded patterns cannot be uniformly reproduced. Here, the case where the encoded patterns cannot be uniformly reproduced will be described with reference to FIG. 16.

FIG. 16A shows an example in which the encoded patterns shown in FIGS. 15A and 15B have been synthesized with the Y plane of the CMYK image data. FIG. 16B shows the threshold matrix of Yellow of the halftone pattern 1. FIG. 16C shows a result obtained by performing the halftone processing on the image data shown in FIG. 16A using the threshold matrix shown in FIG. 16B.

Blocks 1601 and 1604 appearing in FIG. 16A are blocks obtained by synthesizing the encoded pattern shown in FIG. 5A with a signal value of "72", and blocks 1602 and 1603 are blocks obtained by synthesizing the encoded pattern shown in FIG. 5B with the signal value of "72". The halftone processing is performed on the image data with which the encoded patterns have been thus synthesized, using the threshold matrix of Yellow of the halftone pattern 1, shown in FIG. 16B. Note that the line screen set to 134 lpi at 117 degrees, appearing in FIG. 9, is used for the Y plane of the halftone pattern 1 by default. By executing the above-described halftone processing, the image data shown in FIG. 16A is converted into the binary image shown in FIG. 16C.

In blocks 1606 and 1607 appearing in FIG. 16C, even after the image data is converted into the binary image by executing the halftone processing, the dots corresponding to the encoded patterns exist, and hence even if the data is directly printed, it is possible to maintain the periodicity of the encoded patterns on the sheet. On the other hand, in blocks 1605 and 1608 appearing in FIG. 16C, the dots corresponding to the encoded patterns do not exist and are eliminated by the halftone processing, and hence the additional information cannot be extracted from a print obtained by printing this image data. This is because the angle of the encoded patterns and the screen angle of the Y plane of the halftone pattern 1 used for the halftone processing match each other, and hence binary dots are prevented from being formed due to the arrangement of threshold values or an initial phase of the screen matrix. More specifically, gray part of the blocks 1601 and 1604 is compared only with points having high threshold values in the screen matrix shown in FIG. 16B, and as a result, binary dots are not formed. Thus, if the angle of the encoded patterns and the screen angle of the Y plane of the halftone pattern 1 used for the halftone processing match each other, the encoded patterns cannot be uniformly reproduced. As a result, a print from which decoding fails is output.

Figure 17A:
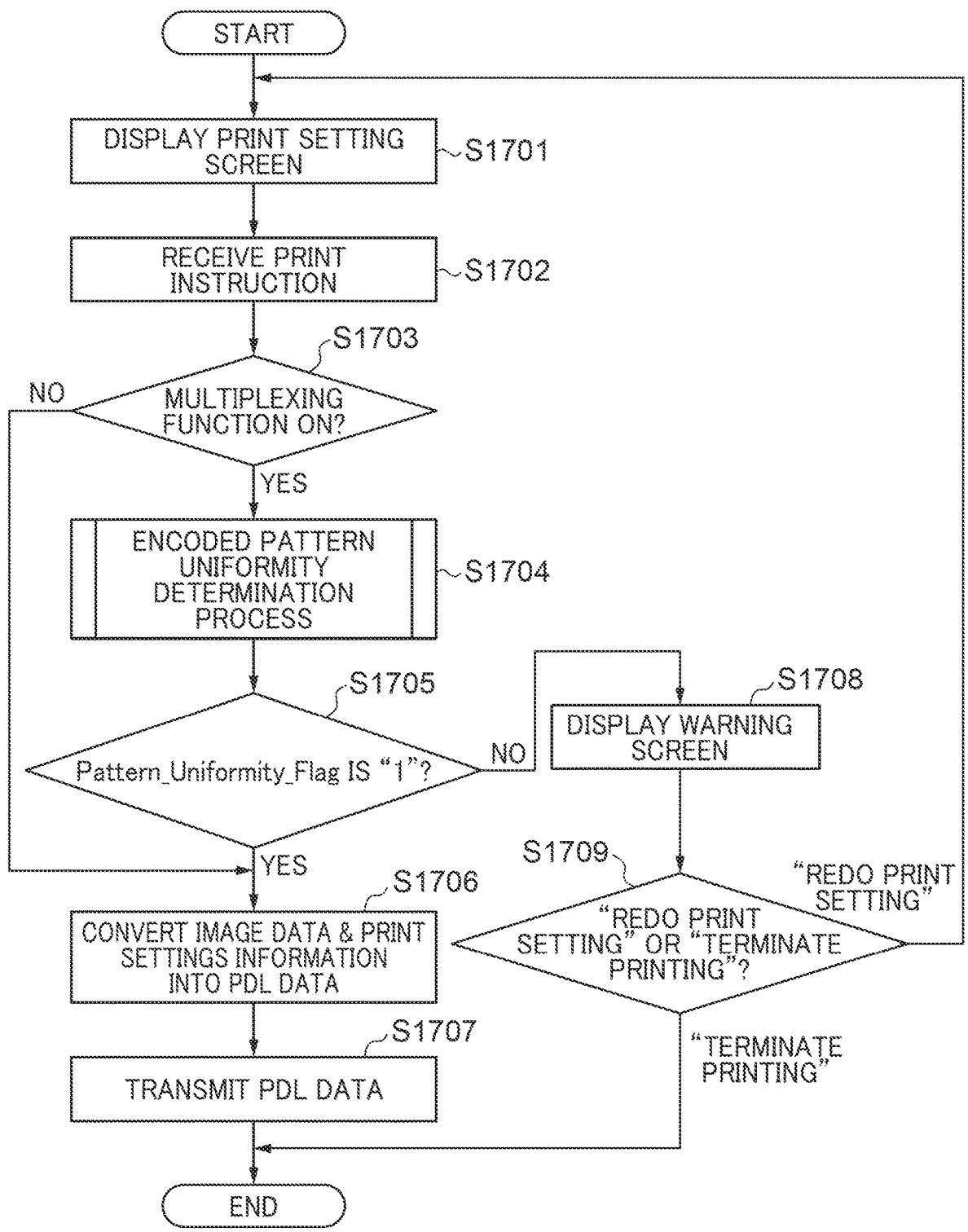
FIG. 17A is a flowchart of a PDL data transmission control process performed by the host PC appearing in FIG. 1A.
Figure 17B:
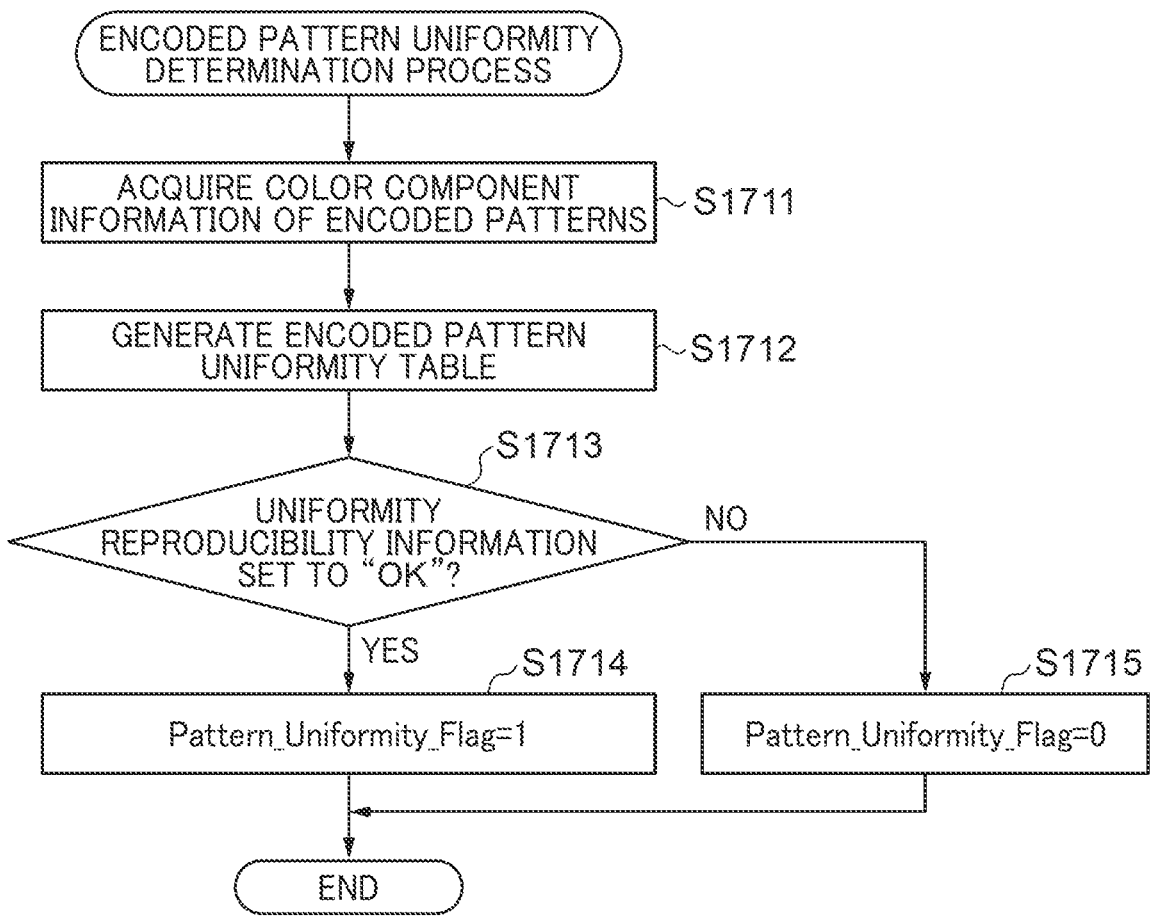
FIG. 17B is a flowchart of an encoded pattern uniformity determination process performed in a step of the PDL data transmission control process in FIG. 17A.

To solve this problem, in the present embodiment, a PDL data transmission control process in FIGS. 17A and 17B is executed.

FIGS. 17A and 17B are flowcharts of the PDL data transmission control process performed by the host PC 100 appearing in FIG. 1. The PDL data transmission control process in FIGS. 17A and 17B is realized by the CPU 201 that executes a program stored in the ROM 202 or the auxiliary storage device 210. FIG. 17A shows the whole PDL data transmission control process.

Referring to FIG. 17A, the CPU 201 displays a print setting screen on the monitor 235 (step S1701). The print setting screen is used by the user to set print settings information, including the ON/OFF information of the multiplexing function, additional information, color component information of encoded patterns, image processing settings information, and so forth, and provide a print instruction. Then, the CPU 201 receives the print instruction from the user (step S1702). Note that the user can provide the print instruction by inputting the print settings information on the print setting screen and selecting a predetermined button.

Then, the CPU 201 acquires the ON/OFF information of the multiplexing function from the print settings information input by the user on the print setting screen and determines whether the multiplexing function is set to ON based on the acquired ON/OFF information of the multiplexing function (step S1703). If it is determined in the step S1703 that the multiplexing function is set to ON, the CPU 201 performs an encoded pattern uniformity determination process in FIG. 17B (step S1704).

FIG. 17B is a flowchart of the encoded pattern uniformity determination process performed in the step S1704 in FIG. 17A.

Referring to FIG. 17B, the CPU 201 acquires the color component information of the encoded patterns from the print settings information input by the user on the print setting screen (step S1711). The color component information of the encoded pattern indicates a color plane in the CMYK image data, with which the encoded patterns are synthesized, as described above.

Figure 18:
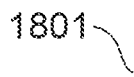
FIG. 18 is a diagram showing an example of an encoded pattern uniformity table generated in a step in FIG. 17.

Then, the CPU 201 generates an encoded pattern uniformity table 1801 shown in FIG. 18 (step S1712). The encoded pattern uniformity table 1801 is generated based on a result of comparison between the screen angle of each color plane in the halftone patterns 1 to 3 and the angle of the encoded patterns synthesized with the CMYK image data. The encoded pattern uniformity table 1801 includes uniformity reproducibility information concerning the halftone patterns 1 to 3 for each color of Cyan, Magenta, Yellow, and Black. The uniformity reproducibility information indicates whether r or not all encoded patterns synthesized with the CMYK image data can be uniformly reproduced ("O K" or "NOT O K"). For example, in a case where the screen angle of the Y plane of the halftone pattern 1 matches the angle of any of the encoded patterns to be synthesized with the CMYK image data, "NOT O K" is set in the uniformity reproducibility information of the Y plane of the halftone pattern 1. On the other hand, in a case where the screen angle of the M plane of the halftone pattern 1 does not match any of the angles of all encoded patterns to be synthesized with the CMYK image data, "O K" is set in the uniformity reproducibility information of the M plane of the halftone pattern 1. In FIG. 18, for example, "NOT O K" is set in the uniformity reproducibility information items of Cyan and Yellow of the halftone pattern 1, Magenta of the halftone pattern 2, and Magenta of the halftone pattern 3. These indicate that the encode patterns cannot be uniformly reproduced in Cyan and Yellow of the halftone pattern 1, Magenta of the halftone pattern 2, and Magenta of the halftone pattern 3. Note that in the encoded pattern uniformity table 1801, "NOT O K" can be set as the uniformity reproducibility information for a color plane having a screen angle which does not completely match the angle of the encoded pattern but approximately matches this angle.

Then, the CPU 201 acquires the uniformity reproducibility information associated with the color plane of the halftone pattern 1, indicated by the color component information of the encoded pattern, acquired in the step S1711, from the encoded pattern uniformity table 1801. The CPU 201 determines whether or not the acquired uniformity reproducibility information indicates "O K" (step S1713).

If it is determined in the step S1713 that the acquired uniformity reproducibility information indicates "O K", the process proceeds to a step S1714. In the step S1714, the CPU 201 outputs Pattern_Uniformity_Flag=1 as a flag indi-cating that it is determined that the encoded patterns can be uniformly reproduced. Then, the encoded pattern uniformity determination process is terminated, and the process proceeds to a step S1705 in FIG. 17A.

If it is determined in the step S1713 that the acquired uniformity reproducibility information indicates not "O K" but "NOT O K", the process proceeds to a step S1715. In the step S1715, the CPU 201 outputs Pattern_Uniformity_Flag=0 as a flag indicating that it is determined that the encoded patterns cannot be uniformly reproduced. Then, the encoded pattern uniformity determination process is terminated, and the process proceeds to the step S1705 in FIG. 17A.

In the step S1705, the CPU 201 determines whether or not the Pattern_Uniformity_Flag is set to "1". If it is determined in the step S1705 that the Pattern_Uniformity_Flag is set to "1", the process proceeds to a step S1706. Further, in a case where it is determined in the step S1703 that the multiplexing function is set not to ON but to OFF, the process also proceeds to the step S1706. In the step S1706, the CPU 201 converts the image data and the print settings information into PDL data. Note that the print settings information includes the halftone setting information determined in the step S1704 that the encoded patterns can be uniformly reproduced. Then, the CPU 201 transmits the PDL data to the additional information-multiplexing apparatus 101 via the network interface 204 (step S1707), followed by terminating the PDL data transmission control process. Thus, in the present embodiment, the PDL data transmitted to the additional information-multiplexing apparatus 101 is generated based on the halftone setting information determined in the step S1704 that the encoded patterns can be uniformly reproduced.

If it is determined in the step S1705 that the Pattern_Uniformity_Flag is set not to "1" but to "0", the process proceeds to a step S1708. In the step S1708, the CPU 201 displays the warning screen 1900 shown in FIG. 19 on the monitor 235 via the input/output interface 220. The warning screen 1900 is for performing a warning notification that notifies a user that a print generated based on the set halftone setting information is a print which can cause failure in decoding the additional information. On the warning screen 1900, there is displayed a warning message that a failure of decoding the additional information can be caused due to impossibility of uniform reproduction of the encoded patterns based on the set halftone setting information by the image forming apparatus 102. Further, the warning screen 1900 displays a "redo print setting" button 1901 and a "terminate printing" button 1902. The CPU 201 waits until the user selects one of the "redo print setting" button 1901 and the "terminate printing" button 1902. When the user selects one of the "redo print setting" button 1901 and the "terminate printing" button 1902, the process proceeds to a step S1709.

In the step S1709, the CPU 201 determines which of the "redo print setting" button 1901 and the "terminate printing" button 1902 is selected by the user. If it is determined in the step S1709 that the "redo print setting" button 1901 is selected by the user, the process returns to the step S1701 to display the print setting screen on the monitor 235. With this, the user can change the halftone setting information to proper halftone setting information that can generate a print which does not cause failure in decoding the additional information.

If it is determined in the step S1709 that the "terminate printing" button 1902 is selected by the user, the PDL data transmission control process is terminated. That is, in the present embodiment, generation of PDL data based on the improper halftone setting information that generates a print which can cause failure in decoding the additional information is prevented, and further, transmission of such PDL data to the additional information-multiplexing apparatus 101 is prevented. With this, it is possible to prevent generation of a print which can cause failure in decoding additional information.

According to the above-described embodiment, in a case where it is determined that the encoded patterns cannot be uniformly reproduced, before outputting a print in which the additional information is embedded, a warning notification for notifying a user that the print can cause failure in decoding the additional information. With this, before a print generated based on the set halftone setting information is output, it is possible to notify a user that the print can cause failure in decoding the additional information. As a result, it is possible to prevent failure in decoding the additional information, beforehand.

Further, in the above-described embodiment, the warning screen 1900 including the message that a failure can be caused in decoding the additional information is displayed on the monitor 235. This enables the user to easily know that, before a print generated based on the set halftone setting information is output, the print can cause failure in decoding the additional information.

Further, the image processing apparatus according to the present embodiment is the host PC 100 (information processing apparatus) that generates PDL data for causing the image forming apparatus 102 to print a print in which additional information is embedded. With this, in a configuration in which the host PC 100 generates PDL data, and the image forming apparatus 102 generates a print in which additional information is embedded based on the PDL data, it is possible to prevent failure in decoding the additional information, beforehand.

Further, in the above-described embodiment, the warning screen 1900 is displayed on the monitor 235 before transmitting the PDL data to the image forming apparatus 102. This enables the user to be aware that a print generated based on the set halftone setting information can cause failure in decoding the additional information before the print is output.

Note that in the present embodiment, the print setting screen is displayed on the monitor 235 as described above when the "redo print setting" button 1901 is selected. On this print setting screen, the halftone patterns 1 to 3 can be displayed as the options of the halftone setting information. Alternatively, out of the halftone patterns 1 to 3, there can be displayed halftone patterns which are determined to enable, when used for the halftone processing, encoded patterns to be uniformly reproduced from a color plane with which the encoded patterns are synthesized, as the options of the halftone setting information. With this, when redoing the halftone setting information, the user can select a desired halftone pattern, out of the halftone patterns determined to enable uniform reproduction of the encoded patterns.

Further, although in the above-described embodiment, the description is given of the case where the image processing apparatus according to the present embodiment is the host PC 100, the image processing apparatus according to the present embodiment is not limited to the host PC 100. For example, the image processing apparatus according to the present embodiment can be the image forming apparatus 102. For example, in a case where the user inputs a print instruction not to the host PC 100 but to the user interface 1720 of the image forming apparatus 102, the image forming apparatus 102 performs the above-described processing operations in the step S1702 et seq. With this control, before a print generated based on the print instruction input to the user interface 1720 of the image forming apparatus 102 by the user is output, it is possible to notify the user that the print can cause failure in decoding the additional information.

Although in the above-described embodiment, the description is given of the configuration in which the additional information-multiplexing apparatus 101 synthesizes the encoded patterns, and the additional information extraction apparatus 103 extracts the additional information, this is not limitative. For example, the image forming apparatus 102 can perform both of synthesis of the encoded patterns and extraction of the additional information. In a case where the image forming apparatus 102 performs both of synthesis of the encoded patterns and extraction of the additional information, the host PC 100 transmits the PDL data to the image forming apparatus 102, and the image forming apparatus 102 performs processing for printing image data generated by encoding the additional information and synthesizing the encoded patterns. At this time, in extracting the additional information, the scanner 730 of the image forming apparatus 102 reads the print and generates scanned image data of the print, and the image forming apparatus 102 performs the above-described additional information extraction process based on the scanned image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-173680 filed Oct. 28, 2022, which is hereby incorporated by reference herein in its entirety.

What is claimed is:

1. An image processing apparatus that performs image processing for generating a print in which additional information is to be embedded, comprising:
   a memory that stores instructions; and
   a processor that causes, by executing the instructions stored in the memory, the image processing apparatus to function as:
   a setting unit configured to set a halftone pattern used for halftone processing out of a plurality of halftone patterns;
   a determination unit configured to determine whether or not, in a case where the set halftone pattern is to be used for the halftone processing, encoded patterns generated based on the additional information can be uniformly reproduced from a color plane with which the encoded patterns are to be synthesized; and
   a control unit configured to perform, in a case where it is determined by the determination unit that the encoded patterns cannot be uniformly reproduced, a notification for notifying, without outputting the print in which the additional information is embedded, a user that the print in which the additional information is to be embedded can cause a failure in a decoding of the additional information.

2. The image processing apparatus according to claim 1, further comprising a display, and
   wherein the control unit displays a predetermined screen including a message that the failure can be caused in decoding the additional information, on the display.

3. The image processing apparatus according to claim 2, wherein an object for instructing redoing of setting the halftone pattern used for the halftone processing is displayed on the predetermined screen.

4. The image processing apparatus according to claim 3, wherein the display displays, according to selection of the object, a selection screen for causing the user to select the halftone pattern used for the halftone processing, out of the plurality of halftone patterns with which the encoded patterns are determined to be capable of being uniformly reproduced from the color plane with which the encoded patterns are synthesized.

5. The image processing apparatus according to claim 1, wherein the image processing apparatus is an information processing apparatus that generates PDL data for causing an image forming apparatus to print the print in which the additional information is embedded.

6. The image processing apparatus according to claim 5, wherein the control unit performs the notification before transmitting the PDL data to the image forming apparatus.

7. The image processing apparatus according to claim 1, wherein the image processing apparatus is an image forming apparatus that performs the halftone processing using the halftone pattern set by the setting unit and outputs the print in which the additional information is embedded.

8. A method of controlling an image processing apparatus that performs image processing for generating a print in which additional information is to be embedded, comprising:
   setting a halftone pattern used for halftone processing out of a plurality of halftone patterns;
   determining whether or not, in a case where the set halftone pattern is to be used for the halftone processing, encoded patterns generated based on the additional information can be uniformly reproduced from a color plane with which the encoded patterns are to be synthesized; and
   performing, in a case where it is determined that the encoded patterns cannot be uniformly reproduced, a notification for notifying, without outputting the print in which the additional information is embedded, a user that the print in which the additional information is to be embedded can cause a failure in a decoding of the additional information.

9. A non-transitory computer-readable storage medium storing a program for causing a computer to execute a method of controlling an image processing apparatus that performs image processing for generating a print in which additional information is to be embedded,
   wherein the method comprises:
   setting a halftone pattern used for halftone processing out of a plurality of halftone patterns;
   determining whether or not, in a case where the set halftone pattern is to be used for the halftone processing, encoded patterns generated based on the additional information can be uniformly reproduced from a color plane with which the encoded patterns are to be synthesized; and
   performing, in a case where it is determined that the encoded patterns cannot be uniformly reproduced, a notification for notifying, without outputting the print in which the additional information is embedded, a user that the print in which the additional information is to be embedded can cause a failure in a decoding of the additional information.

* * * * *